United States Patent
Furuyama et al.

(10) Patent No.: US 11,109,200 B2
(45) Date of Patent: Aug. 31, 2021

(54) MOVING BODY COMMUNICATION SYSTEM

(71) Applicant: DENSO CORPORATION, Kariya (JP)

(72) Inventors: Takahiro Furuyama, Kariya (JP); Tsuneo Nakata, Kariya (JP)

(73) Assignee: DENSO CORPORATION, Aichi-pref (JP)

( * ) Notice: Subject to any disclaimer, the term of this patent is extended or adjusted under 35 U.S.C. 154(b) by 9 days.

(21) Appl. No.: 16/794,712

(22) Filed: Feb. 19, 2020

(65) Prior Publication Data

US 2020/0186980 A1 Jun. 11, 2020

Related U.S. Application Data

(63) Continuation of application No. PCT/JP2018/028252, filed on Jul. 27, 2018.

(30) Foreign Application Priority Data

Aug. 23, 2017 (JP) .............................. JP2017-160361

(51) Int. Cl.
*H04W 4/00* (2018.01)
*H04W 4/40* (2018.01)
(Continued)

(52) U.S. Cl.
CPC ............... *H04W 4/40* (2018.02); *H04W 4/80* (2018.02); *H04W 60/00* (2013.01); *H04W 68/005* (2013.01); *H04W 92/18* (2013.01)

(58) Field of Classification Search
CPC ......... H04W 4/40; H04W 4/80; H04W 60/00; H04W 68/005; H04W 92/18; H04W 4/46;
(Continued)

(56) References Cited

U.S. PATENT DOCUMENTS

| 6,407,698 | B1 * | 6/2002 | Ayed ....................... G01S 1/047 |
| | | | 342/357.31 |
| 6,489,921 | B1 * | 12/2002 | Wilkinson ......... G01C 21/3685 |
| | | | 342/357.31 |

(Continued)

FOREIGN PATENT DOCUMENTS

JP 2017-005407 A 1/2017

OTHER PUBLICATIONS

Zhioua, Ghayet El Mouna et al. "A Traffic QoS Aware Approach for Cellular Infrastructure Offloading Using VANETs", 2014 IEEE 22nd International Symposium of Quality of Service, pp. 278-283.

(Continued)

*Primary Examiner* — Marceau Milord
(74) *Attorney, Agent, or Firm* — Maschoff Brennan

(57) ABSTRACT

A moving body communication system includes: a plurality of user apparatuses each used on a moving body; and a server that is configured to distribute, to at least one of the user apparatuses as a requester, commonly used data as data used commonly by the plurality of the user apparatuses, based on a request from the at least one of the user apparatuses. The user apparatus as the requester is configured to execute processing for acquisition of the commonly used data from an already-acquiring apparatus positioned around the requester via a narrow-area communication in response to that acquirability of the commonly used data via the narrow-area communication is notified as a response from the server to a distribution request.

13 Claims, 9 Drawing Sheets

(51) Int. Cl.
*H04W 4/80* (2018.01)
*H04W 60/00* (2009.01)
*H04W 68/00* (2009.01)
*H04W 92/18* (2009.01)

(58) Field of Classification Search
CPC ....... H04W 8/22; H04W 84/10; H04W 84/18; H04W 84/005; H04W 4/027; H04W 4/06
USPC .......................................................... 370/329
See application file for complete search history.

(56) References Cited

U.S. PATENT DOCUMENTS

| | | | |
|---|---|---|---|
| 6,650,999 B1 * | 11/2003 | Brust | B60R 25/102 340/932.2 |
| 6,791,477 B2 * | 9/2004 | Sari | G01S 5/0063 340/8.1 |
| 7,522,999 B2 * | 4/2009 | Wence | G01C 21/28 701/502 |
| 8,237,591 B2 * | 8/2012 | Holcomb | H04M 3/493 340/990 |
| 8,392,118 B2 * | 3/2013 | Korn | G01C 21/00 701/533 |
| 9,074,892 B2 * | 7/2015 | Fink | G01C 21/20 |
| 9,116,000 B2 * | 8/2015 | Pakzad | G01C 22/006 |
| 9,403,415 B2 * | 8/2016 | Lu | B60G 17/019 |
| 9,562,769 B2 * | 2/2017 | Korn | G01C 21/00 |
| 9,686,124 B2 * | 6/2017 | Ameixiera | H04W 56/0025 |
| 9,930,608 B2 * | 3/2018 | Braga Ameixieira | H04W 40/244 |
| 10,165,406 B2 * | 12/2018 | Hong | H04W 64/006 |
| 10,223,744 B2 * | 3/2019 | Brady | B60R 16/0231 |
| 2003/0016636 A1 * | 1/2003 | Tari | H04W 8/26 370/328 |
| 2005/0200521 A1 * | 9/2005 | Rodriguez | G01C 21/20 342/357.31 |
| 2008/0002709 A1 * | 1/2008 | Kennedy | H04L 12/2856 370/395.1 |
| 2008/0106391 A1 * | 5/2008 | Santavicca | B60R 25/24 340/426.36 |

OTHER PUBLICATIONS

Cao, Yi et al. "SDN Enabled Content Distribution in Vehicular Networks", 4th Edition of the International Conference of the Innovative Computing Technology (INTECH2014) IEEE, Aug. 13, 2014, pp. 164-169.

Adachi Yoshitake et al; "Cloud-assisted Dynamic Content Sharing among Vehicles", 2016 IEEE International Conference on Computer and Information Technology (CIT), IEEE, Dec. 8, 2016, pp. 516-523.

Ouyuan Luo et al; "CFT: A Cluster-based File Transfer Scheme for Highway VANETs", arxiv. org, Cornell University Library, 201 Olin Library Cornell University Ithaca, NY 14853, Jan. 8, 2017, 7 pgs.

* cited by examiner

| APPARATUS ID | RECEIVED TIME | POSITION | SPEED | TRAVEL DIRECTION | DIRECTION INDICATOR | DATA ACQUISITION STATUS |
|---|---|---|---|---|---|---|
| 101 | T1a | (Xa, Ya) | Va | θa | – | × |
| 102 | T1b | (Xb, Yb) | Vb | θb | – | ○ |
| 103 | T1c | (Xc, Yc) | Vc | θz | RIGHT | ○ |
| ... | ... | ... | ... | ... | | |

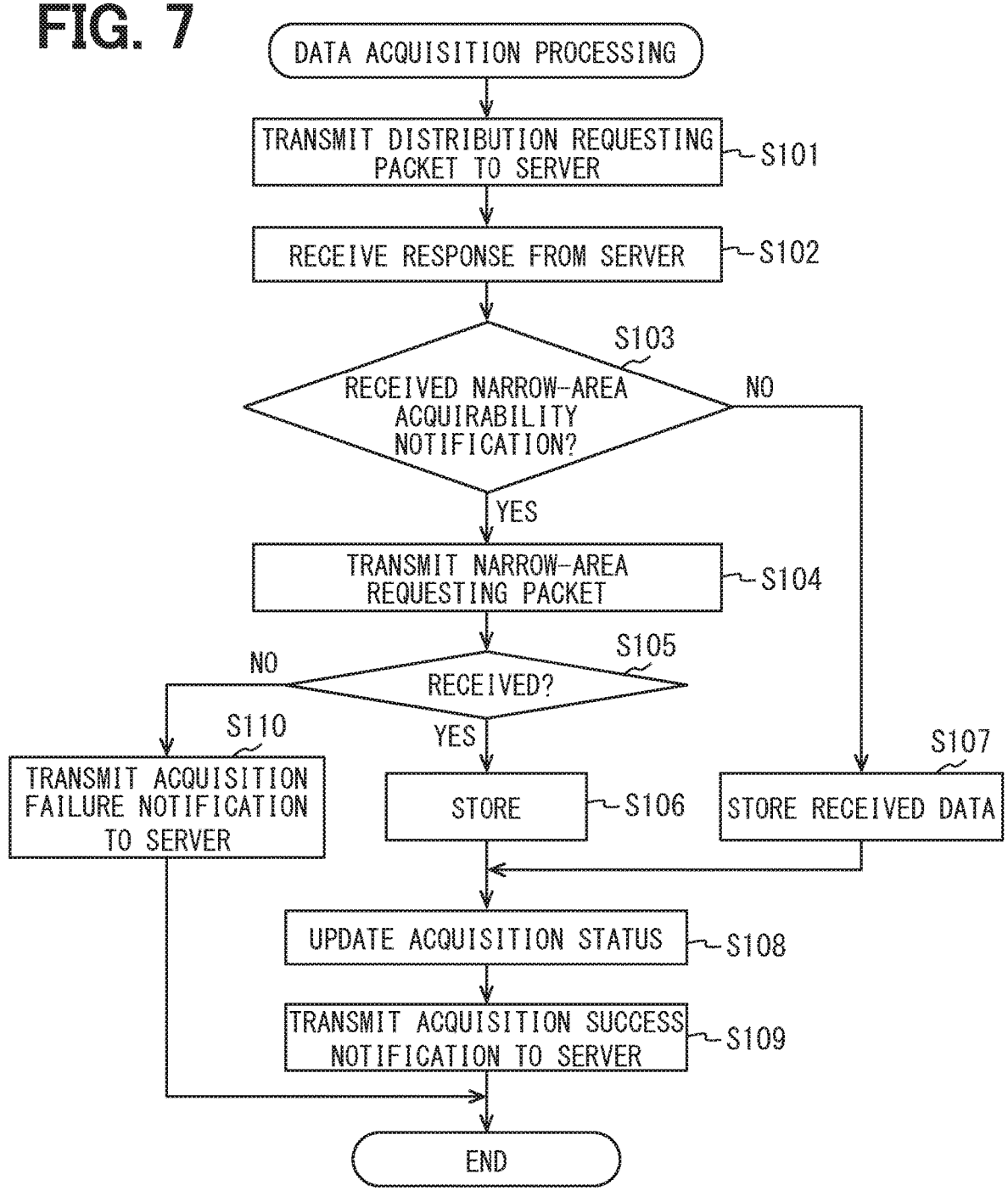

FIG. 10
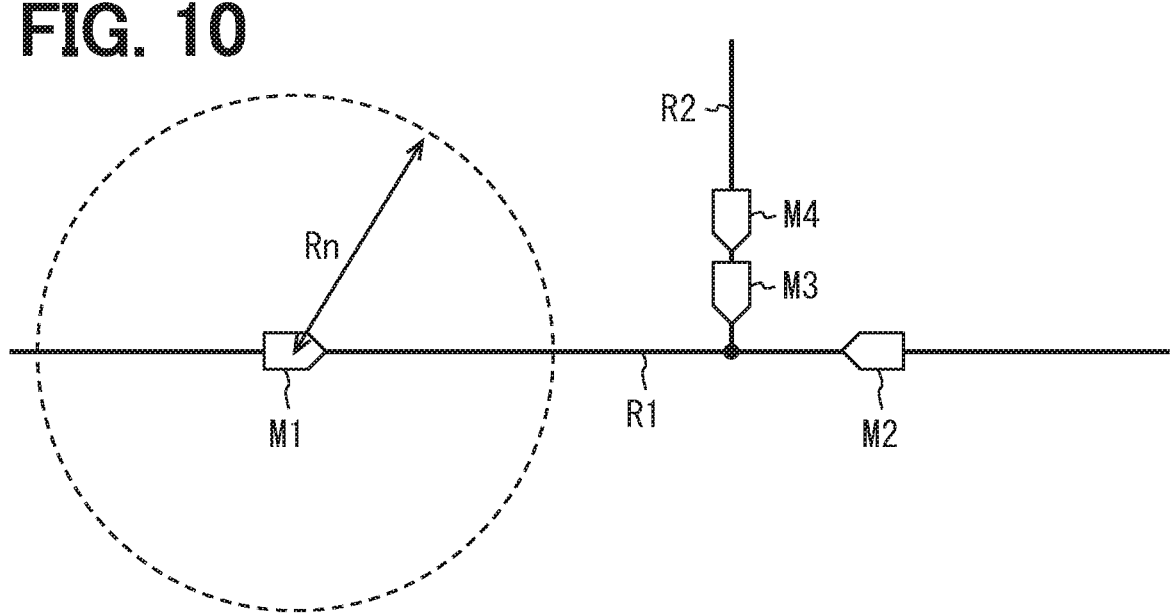
FIG. 11
| DESTINATION INFORMATION (APPARATUS ID) | BIT STRING INDICATING ACQUIRABILITY VIA NARROW-AREA COMMUNICATION | REQUEST STANDBY TIME |
FIG. 12
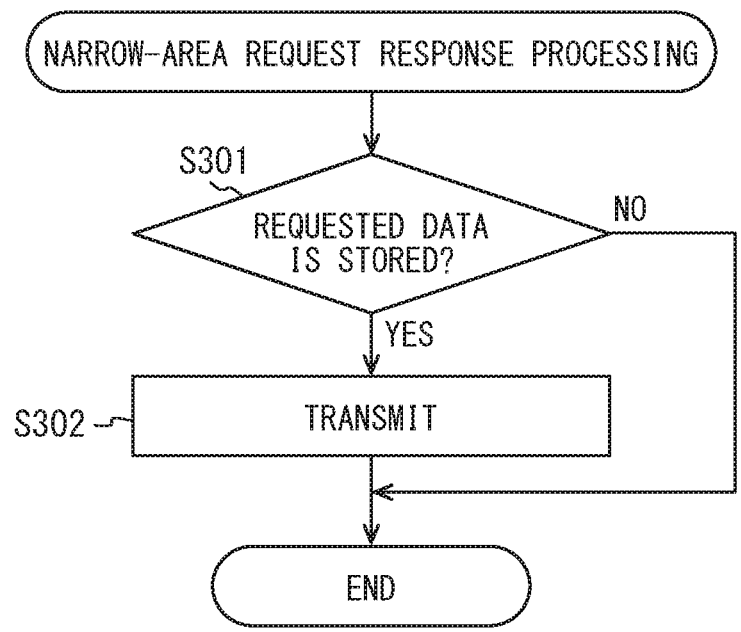

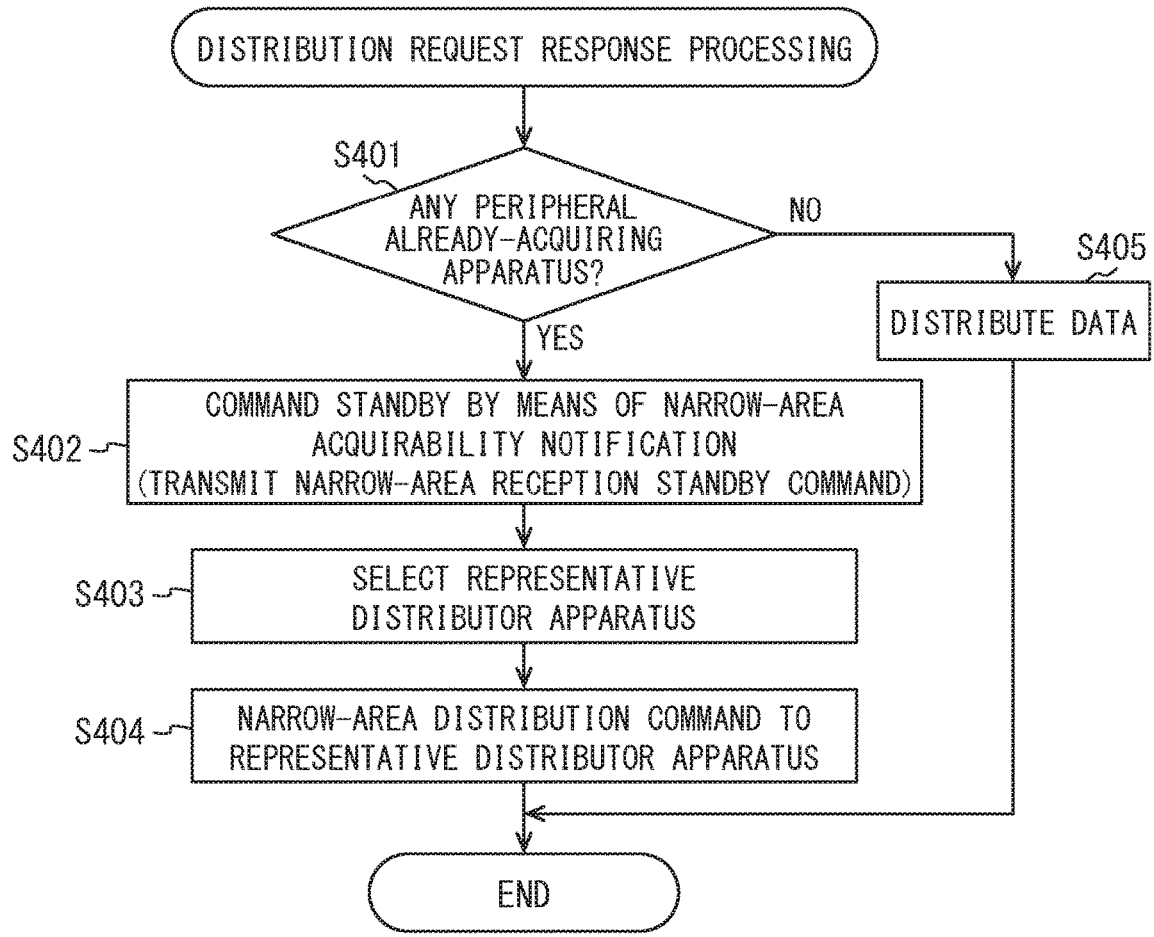
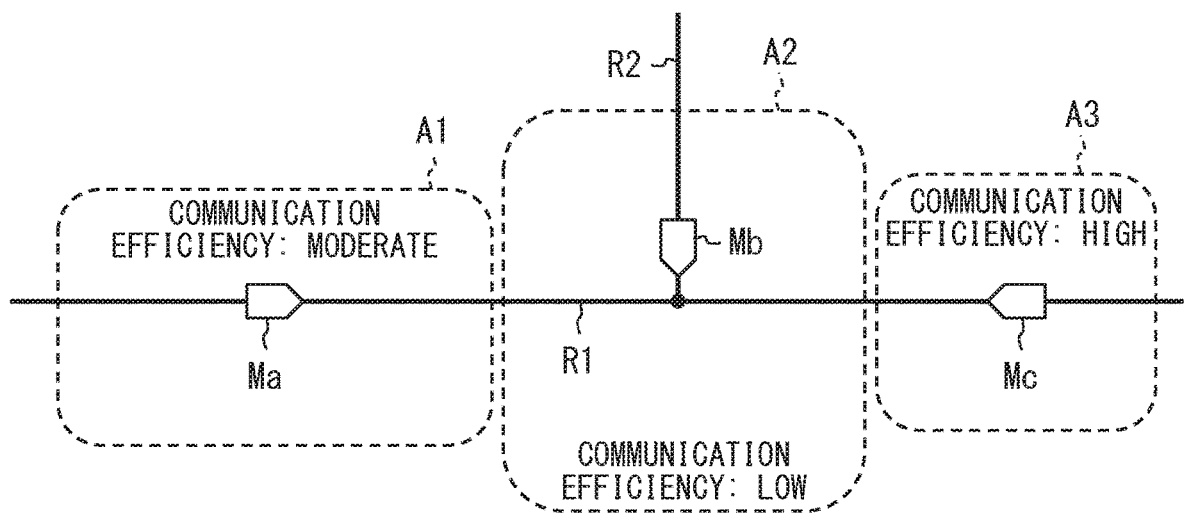

MOVING BODY COMMUNICATION SYSTEM

CROSS REFERENCE TO RELATED APPLICATION

The present application is a continuation application of International Patent Application No. PCT/JP2018/028252 filed on Jul. 27, 2018 which designated the U. S. and claims the benefit of priority from Japanese Patent Application No. 2017-160361 filed on Aug. 23, 2017. The entire disclosures of all of the above applications are incorporated herein by reference.

TECHNICAL FIELD

The present disclosure relates to a moving body communication system between a server and a user apparatus used on a moving body.

BACKGROUND

There has been available a moving body communication system including a plurality of user apparatuses used on moving bodies and configured to download predetermined common data from a server via a wide-area communication network. The common data indicates data having identical contents and commonly used by the plurality of user apparatuses in this case. A user apparatus is configured to be wirelessly accessible to a wide-area communication network, and examples of the user apparatus include a smartphone and an apparatus used in a vehicle.

SUMMARY

According to one aspect of the present disclosure, a moving body communication system may comprise: a plurality of user apparatuses each used on a moving body; and a server that is configured to distribute, to at least one of the user apparatuses as a requester, commonly used data as data used commonly by the plurality of the user apparatuses, based on a request from the at least one of the user apparatuses.

BRIEF DESCRIPTION OF DRAWINGS

The above and other objects, features, and advantages of the present disclosure will become more apparent from the following detailed description with reference to the accompanying drawings. In the drawings:

FIG. 7 is a flowchart of data acquisition processing executed by the controller;

FIG. 8 is a diagram depicting an exemplary schematic configuration of a distribution requesting packet transmitted from the onboard apparatus to the server;

FIG. 10 is an explanatory view of a shortly distributable apparatus;

FIG. 11 is a diagram depicting a schematic configuration of a narrow-area acquirability notification transmitted from the server to the onboard apparatus;

FIG. 12 is a flowchart of narrow-area request response processing executed by the controller;

FIG. 13 is a flowchart of distribution request response processing executed by a server controller disclosed in a second modification;

FIG. 14 is an explanatory view of operation executed by a server controller disclosed in a third modification;

DETAILED DESCRIPTION

Figure 1:
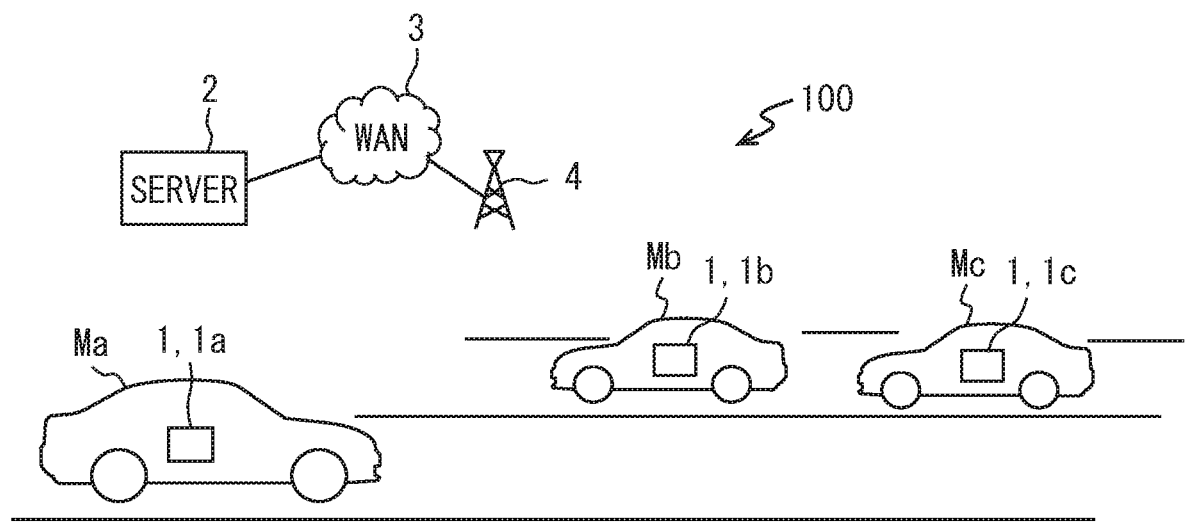
FIG. 1 is a view depicting a schematic configuration of a moving body communication system.

A moving body communication system including a plurality of user apparatuses used on moving bodies and configured to download predetermined common data from a server via a wide-area communication network has been known. Herein, the common data indicates data having identical contents and commonly used by the plurality of user apparatuses. A user apparatus is configured to be wirelessly accessible to a wide-area communication network, and examples of the user apparatus include a smartphone and an apparatus used in a vehicle.

Such a moving body communication system may have a difficulty of processing loads applied to the server and a router constituting the wide-area communication network if all the user apparatuses operate to acquire data directly from the server. When the user apparatuses are each configured to acquire data from the server via the wide-area communication network, there will be charged communication fees corresponding to size of downloaded data.

When the plurality of user apparatuses shares identical data, the plurality of user apparatuses may execute direct communication (the so-called ad hoc communication). Such data sharing via the ad hoc communication does not need access to the server from each communication terminal, leading to reduction of the processing loads applied to the server and the like and the communication fees.

A related art describes a user apparatus configured to acquire data from a server via a wide-area communication network as well as configured to acquire data via direct communication with a different user apparatus (hereinafter, referred to as a different apparatus), and the user apparatus is further configured to select either the server or the different apparatus as a data acquisition target in accordance with a type of the data to be acquired.

A user apparatus in a related art once requests a peripheral user apparatus to distribute the data when the data to be acquired is of a type to be acquired from the different apparatus. If there is no peripheral different apparatus that can distribute the data, the user apparatus requests the server to distribute the target data and acquires the target data from the server.

When the data to be acquired is of a type to be acquired from the server, the user apparatus according to a related art acquires the data from the server even if there is any peripheral different apparatus that can directly distribute the data. The user apparatus may thus execute unnecessary communication via the wide-area communication network. The user apparatus is preferred, in terms of communication fees, to acquire the data from the different apparatus for reduction of the communication fees if the data can be acquired directly from the different apparatus.

The present disclosure describes a moving body communication system configured to suppress communication fees to be charged when a user apparatus acquires data distributed by a server.

According to one aspect, a moving body communication system may include: a plurality of user apparatuses each used on a moving body; and a server that is configured to distribute, to at least one of the user apparatuses as a requester, commonly used data as data used commonly by the plurality of the user apparatuses, based on a request from the at least one of the user apparatuses. In the moving body communication system, the server and each of the plurality of user apparatuses are configured to be mutually communicable via a wide-area communication network. Each of the plurality of the user apparatuses includes a reporting section that is configured to sequentially transmit, to the server, a position reporting packet as a communication packet indicating positional information on a current position, and a narrow-area communicator as a communication module configured to execute narrow-area communication as direct wireless communication not using the wide-area communication network with each different apparatus as a different one of the user apparatuses. The server includes: a management database that is implemented by a predetermined rewritable storage medium, and is configured to store data indicating an acquisition status of the commonly used data and positional information on each of the user apparatuses; an apparatus information management section that is configured to update the positional information on each of the user apparatuses stored in the management database, based on the position reporting packet transmitted from each of the plurality of the user apparatuses; a peripheral apparatus search section that is configured to refer to the management database in response to receipt of a distribution request for the commonly used data from any one of the user apparatuses, and determine whether at least one already-acquiring apparatus as the user apparatus that has already acquired the commonly used data exists around the requester; a notification section that is configured to notify the requester of acquirability of the commonly used data via the narrow-area communication in response to a determination by the peripheral apparatus search section that the already-acquiring apparatus exists around the requester; and a distribution section that is configured to distribute the commonly used data in response to a determination by the peripheral apparatus search section that no already-acquiring apparatus exists around the requester. The user apparatus as the requester includes a narrow-area line acquisition section that is configured to execute processing for acquisition of the commonly used data from the already-acquiring apparatus positioned around the requester via the narrow-area communication in response to that the acquirability of the commonly used data via the narrow-area communication is notified as a response from the server to the distribution request.

According to another aspect of the present disclosure, a communication system may comprise: a plurality of user apparatuses each mounted on a moving body; and a server that is configured to distribute common data based on a request from the at least one of the user apparatuses as a requester, the common data being used commonly by the plurality of the user apparatuses. The server and each of the plurality of user apparatuses are configured to be mutually communicable via a communication network. Each of the plurality of the user apparatuses transmit, to the server, a position reporting packet indicative of positional information on a current position of the corresponding user apparatus. Each of the plurality of the user apparatuses includes a communication module that executes communication as direct wireless communication not using the communication network, with each different apparatus as a different one of the user apparatuses. The server includes a management database that stores data indicating an acquisition status of the common data and positional information on each of the user apparatuses. The server is configured to update the positional information on each of the user apparatuses stored in the management database, based on the position reporting packet transmitted, refer to the management database in response to receipt of a distribution request for the common data from the requester so as to determine whether at least one of the user apparatus that has already acquired the common data as an already-acquiring apparatus exists around the requester, notify the requester of acquirability of the common data via the communication in response to a determination that the already-acquiring apparatus exists around the requester, and distribute the common data in response to a determination that no already-acquiring apparatus exists around the requester. The user apparatus as the requester is configured to execute processing for acquisition of the common data from the already-acquiring apparatus positioned around the requester via the communication, in response to that the server notifies the user apparatus as the requester that the common data is available to be acquired via the communication.

In the moving body communication system thus configured, the server is configured to distribute the data requested by the requester in a case where there is, around the user apparatus as the requester, no different user apparatus (that is, already-acquiring apparatus) which has already acquired the commonly used data requested by the requester. In another case where there is the already-acquiring apparatus around the user apparatus as the requester, the server notifies acquirability of the commonly used data as an acquisition target via narrow-area communication.

The user apparatus as the requester having received the notification executes processing for acquisition of the data from the already-acquiring apparatus positioned around the requester via narrow-area communication. Such a configuration causes the user apparatus to be less likely to acquire the data from the server via wide-area communication, for reduction of communication fees and the like.

An embodiment of the present disclosure will now be described with reference to the drawings. FIG. 1 is a view depicting an exemplary schematic configuration of a moving body communication system 100 according to the present disclosure. As depicted in FIG. 1, a moving body communication system 100 includes a plurality of in-vehicle apparatus 1 mounted respectively on a plurality of vehicles Ma, Mb, and Mc, and a server 2. The moving body may be referred to as a movable body. The moving body may correspond to a vehicle, for example.

FIG. 1 depicts only three vehicles (hereinafter, referred to as a equipped vehicles) equipped with the in-vehicle apparatus 1, namely, the vehicles Ma, Mb, and Mc for convenience, although there are actually a large number of (for example, at least four) vehicles. The in-vehicle apparatus 1 mounted on the equipped vehicles Ma, Mb, and Mc will be hereinafter distinguished as in-vehicle apparatus 1a, 1b, and 1c, respectively, where necessary.

For a specific one of the in-vehicle apparatus 1, the vehicle equipped with the in-vehicle apparatus 1 corresponds to a subject vehicle, and the remaining vehicles correspond to different vehicles. The in-vehicle apparatus 1 mounted on the different vehicles correspond to different apparatuses. For the in-vehicle apparatus 1a, the vehicle Ma corresponds to the subject vehicle whereas the vehicles Mb and Mc correspond to the different vehicles. The in-vehicle apparatus 1b and 1c correspond to the different apparatuses for the in-vehicle apparatus 1a. Assuming that there is any different apparatus, one of the in-vehicle apparatus 1 itself will be referred to as the subject apparatus for the specific in-vehicle apparatus. The in-vehicle apparatus 1 may also be referred to as an in-vehicle system. The in-vehicle apparatus 1 corresponds to the user apparatus according to the present disclosure.

The equipped vehicles each travel on a road. Each of the equipped vehicles may be configured as a four-wheel vehicle, a two-wheel vehicle, a three-wheel vehicle, or the like. Examples of the two-wheel vehicle include a motorcycle. The equipped vehicle according to the present embodiment is exemplified as a four-wheel vehicle.

(Outline)

The in-vehicle apparatus 1 are each configured to execute predetermined software for provision of a function compliant with the software. The server 2 is configured to distribute an update program of the software when the software executed by the in-vehicle apparatus 1 has any upgrade.

The update program of the software is commonly used by the in-vehicle apparatus 1 configured to execute the software. The update program of the software thus corresponds to data commonly used by the plurality of in-vehicle apparatus 1 (that is, commonly used data). Assume that the software hereinafter is used by the in-vehicle apparatus 1 and has an update program and the like to be distributed by the server 2. The server 2 may distribute update programs of a plurality of types of software.

Examples of the software used by the in-vehicle apparatus 1 include an operating system (OS), vehicle control software, peripheral monitoring software, and HMI control software. The vehicle control software relates to control of a vehicle. The peripheral monitoring software is prepared for generation of vehicle peripheral information on the basis of data output from a peripheral monitoring device such as a millimeter-wave radar, a laser radar, or a camera. The HMI control software is prepared for operation control of a device relevant to information presentation to a driver (the so-called human machine interface (HMI)).

The various types of software mentioned above can be further categorized in accordance with functions. For example, the vehicle control software is categorized into driving assist software for execution of vehicle control for assistance of driving operation by a driver, automated driving software for provision of an automated driving function, and the like. Examples of the vehicle control software further include vehicle control software for control of a driving source of an engine or a motor, and software for control of a steering actuator.

The examples of the software used by the in-vehicle apparatus 1 further include application software for provision of a function for user convenience (convenience software), such as software for provision of a navigation function and software for operation control of an air conditioner. The examples of the software used by the in-vehicle apparatus 1 accordingly include software used by various electronic control units (ECU) mounted on the vehicles. The types of the software handled for distribution of update programs and the like by the server 2 may be set appropriately.

Each of the in-vehicle apparatus 1 is configured to be wirelessly connected to a wide-area communication network 3. The wide-area communication network 3 herein corresponds to a public communication network provided by a telecommunications carrier and is exemplified by a mobile phone network, the Internet, and the like. FIG. 1 depicts a base station 4 functioning as a wireless base station allowing each of the in-vehicle apparatus 1 to be wirelessly connected to the wide-area communication network 3.

Each of the in-vehicle apparatus 1 is configured to be narrow-area communicable with the different in-vehicle apparatus 1 positioned around the in-vehicle apparatus 1 as the subject apparatus using a radio wave in a predetermined frequency band. Such narrow-area communication herein relates to direct wireless communication with the different in-vehicle apparatus 1 without using the wide-area communication network.

It is possible to adopt any appropriate standard for prescription of a frequency, a modulation system, and the like for achievement of narrow-area communication. In view of the condition that the in-vehicle apparatus 1 are each mounted on the vehicles, exemplarily assume that narrow-area communication is executed in conformity to the standard for wireless access in vehicular environment (WAVE) disclosed in IEEE1609 and the like. WAVE is a standard for direct wireless communication between vehicles (the so-called inter-vehicle communication). Narrow-area communication executed between the in-vehicle apparatus 1 corresponds to inter-vehicle communication from a different viewpoint.

The server 2 is wiredly or wirelessly connected to the wide-area communication network 3. As described earlier, the server 2 is configured to distribute an update program of software used by the in-vehicle apparatus 1. When certain software has any issued update program, the server 2 notifies the in-vehicle apparatus 1 using the software of availability of the update program of the software. Each of the in-vehicle apparatus 1 accordingly recognizes whether there is any data to be acquired from the server 2 (that is, an update program of software in use). If the in-vehicle apparatus 1 detects data to be acquired from the server 2, the in-vehicle apparatus 1 transmits a distribution request for the data to the server 2 at predetermined timing.

The in-vehicle apparatus 1 may inquire of the server 2 as to whether any update program of software has been released in a predetermined cycle, to sequentially determine whether there is any data to be acquired from the server 2.

The server 2 distributes the data (hereinafter, referred to as a requested data) requested by the in-vehicle apparatus 1 to the in-vehicle apparatus 1 as a requester in accordance with the request from the in-vehicle apparatus 1. As to be separately described later, if there is any in-vehicle apparatus 1 (hereinafter, referred to as an already-acquiring apparatus) which has already acquired the requested data around the in-vehicle apparatus 1 as the requester, the server notifies the requester of acquirability of the requested data from the already-acquiring apparatus via narrow-area communication to cause the requester to acquire the requested data via narrow-area communication. Various constituent elements of the moving body communication system 100 will now be described in detail one by one.

(Configuration of In-Vehicle Apparatus 1)

Figure 2:
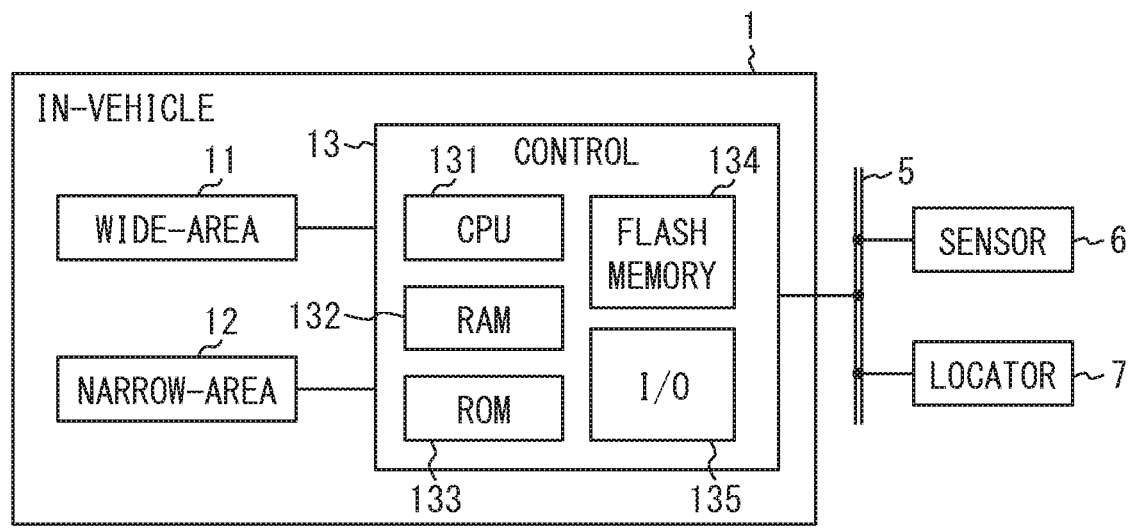
FIG. 2 is a block diagram depicting a configuration of an onboard apparatus.

The in-vehicle apparatus 1 will initially be described in terms of their configuration. As depicted in FIG. 2, each of the in-vehicle apparatus 1 includes a wide-area communicator 11, a narrow-area communicator 12, and a controller 13. The in-vehicle apparatus 1 is connected to various sensors 6 mounted on the vehicle and a locator 7 via a communication network 5 constructed in the vehicle, so as to enable one-way or two-way communication.

The sensors 6 are each configured to detect predetermined physical state quantity indicating a state of the equipped vehicle. Examples of the sensors 6 include an orientation sensor configured to detect absolute orientation of the subject vehicle. The orientation sensor may be exemplified by a geomagnetic field sensor. The examples of the sensors 6 also include a vehicle speed sensor configured to detect travel speed. The examples of the sensors 6 further include a direction indicator sensor configured to detect an operation state of a direction indicator. Each of the various sensors 6 sequentially provides the in-vehicle apparatus 1 with data indicating a current value (that is, detection result) of physical state quantity as a detection target. Detection results of such various onboard sensors may be provided to the in-vehicle apparatus 1 via a single or a plurality of ECUs or the like.

The types of the sensors 6 connected to the in-vehicle apparatus 1 may be set appropriately, and the in-vehicle apparatus 1 is not necessarily connected to all the sensors described above. The in-vehicle apparatus 1 may optionally be connected to any sensor other than those described above, such as an accelerator sensor configured to detect an accelerator operated amount, a brake sensor configured to detect a brake operated amount, and a shift position sensor configured to detect a shift position.

The locator 7 is configured to sequentially calculate (in other words, specify) a position of the vehicle provided with the locator 7 (that is, the subject vehicle). The locator 7 exemplarily includes a global navigation satellite system (GNSS) receiver configured to receive a positioning signal transmitted from a positioning satellite constituting an GNSS, and is configured to calculate a position using the positioning signal received by the GNSS receiver.

The locator 7 may alternatively be configured to determine a position in accordance with a positioning result of the GNSS receiver combined with a measurement result of a gyrosensor, the vehicle speed sensor, or the like. The locator 7 may still alternatively be configured to execute processing of overlapping a locus of determined positions with a road shape indicated by map data (so-called map matching) for positional correction. The locator 7 sequentially specifies positional information indicating a current position and provides the positional information to the in-vehicle apparatus 1.

The wide-area communicator 11 is wirelessly connected to the wide-area communication network 3 and functions as a communication module configured to allow the in-vehicle apparatus 1 to communicate with a different communication apparatus (the server 2 herein) via the wide-area communication network 3. The wide-area communicator 11 includes, as more detailed elements, a wide-area communication antenna and a wide-area communication transceiver portion (not shown).

The wide-area communication antenna is configured to transmit and receive a radio wave in a predetermined frequency band used for wireless communication with the base station 4. The wide-area communication transceiver portion is configured to demodulate a signal received by the wide-area communication antenna and provide the controller 13 with the demodulated signal, as well as modulate data received from the controller 13 and output the modulated data to the wide-area communication antenna for wireless communication.

When the wide-area communication antenna and the wide-area communication transceiver portion operate in cooperation, the wide-area communicator 11 functions as a communication module configured to output received data to the controller 13, as well as modulate data received from the controller 13 and transmit the modulated data to an external apparatus (for example, the server 2).

The narrow-area communicator 12 is a communication module configured to execute direct wireless communication (that is, narrow-area communication) with the different in-vehicle apparatus 1 by means of a radio wave in a predetermined frequency band. The narrow-area communicator 12 includes, as more detailed elements, a narrow-area communication antenna and a narrow-area communication transceiver portion (not shown).

The narrow-area communication antenna is configured to transmit and receive a radio wave in a frequency band used for narrow-area communication (for example, the 760 MHz band or the 5.8 GHz band). The narrow-area communication transceiver portion is configured to demodulate a signal received by the narrow-area communication antenna and provide the controller 13 with the demodulated signal, as well as modulate data received from the controller 13 and output the modulated data to the narrow-area communication antenna for wireless communication.

The narrow-area communicator 12 according to the present embodiment is a communication module enabling inter-vehicle communication. The narrow-area communicator 12 functioning as an inter-vehicle communication module is configured to communicate with the different apparatuses within an area having a radius of several hundred meters around the subject apparatus.

The narrow-area communicator 12 exemplified in the present embodiment is a communication module providing a wireless communication function in conformity to an inter-vehicle communication standard for a communication range of about several hundred meters, although the narrow-area communicator 12 is not limited thereto. The narrow-area communicator 12 according to a different aspect may be a communication module configured to execute communication (hereinafter, referred to as a short-distance communication) in conformity to a predetermined short-distance wireless communication standard for a communication range of at most about several dozens of meters. Examples of the short-distance wireless communication standard include Bluetooth (registered trademark) Low Energy, Wi-Fi (registered trademark), and ZigBee (registered trademark).

The controller 13 is configured as a computer including a CPU 131, a RAM 132, a ROM 133, a flash memory 134, an I/O 135, bus lines connecting these elements, and the like. The CPU 131 is a central processing unit, the RAM 132 is a volatile memory, and the ROM 133 is a non-rewritable nonvolatile storage medium. The ROM 133 stores firmware, an identification number (hereinafter, referred to as an apparatus ID) assigned uniquely to the in-vehicle apparatus 1. The flash memory 134 is a rewritable nonvolatile storage medium.

The flash memory 134 stores programs (hereinafter, referred to as UE programs) causing a vehicle model of the subject vehicle or an ordinary computer to function as the in-vehicle apparatus 1. The UE programs include an OS, middleware, application software, and the like. The application software also includes software handled by the server 2.

The programs (hereinafter, referred to as UE programs) causing an ordinary computer to function as the in-vehicle apparatus 1 only have to be stored in a non-transitory tangible storage medium, which is not specifically limited to the flash memory 134. Specific examples of the storage medium include a substantial storage medium and exclude a transmission medium such as light or an electromagnetic wave. Execution of the UE programs by the CPU 131 corresponds to execution of methods according to the UE programs. The expression "UE" is an abbreviation for user equipment.

Figure 3:
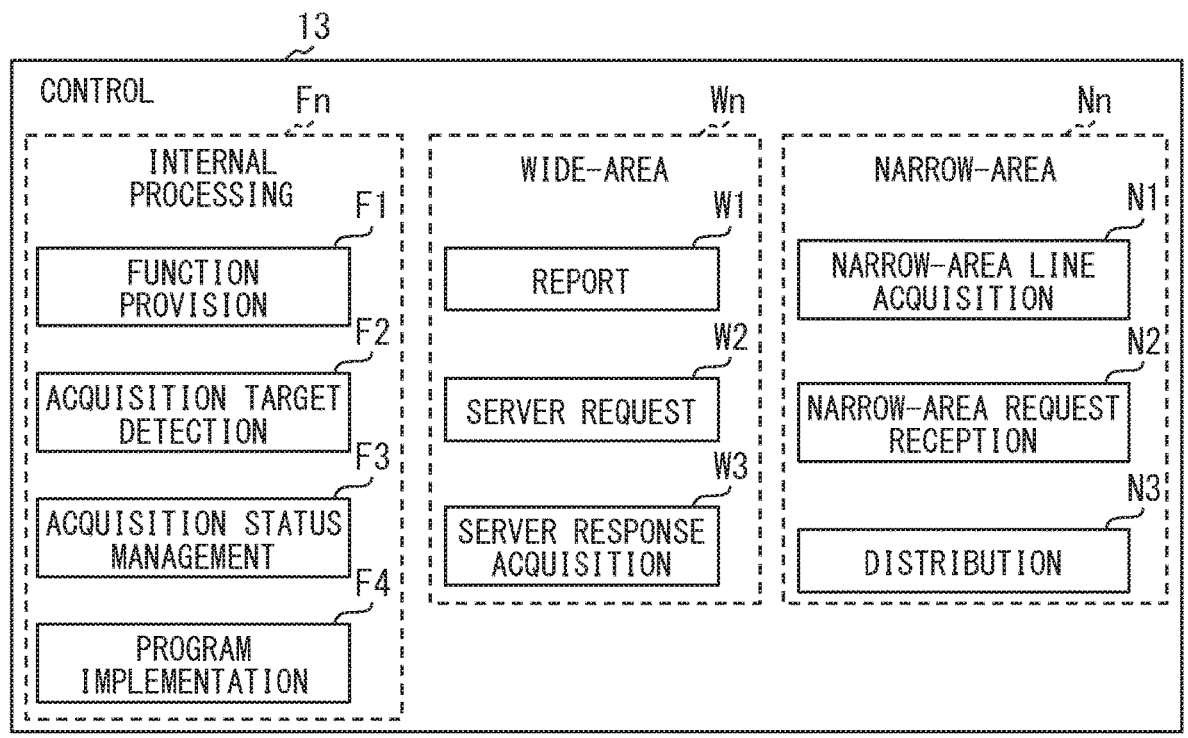
FIG. 3 is a functional block diagram depicting a configuration of a controller.

When the CPU 131 executes the UE programs stored in the flash memory 134 or the like, the controller 13 provides various functions indicated in FIG. 3. Specifically, the controller 13 includes an internal processor Fn configured to execute internal processing such as management of an acquisition status of an update program of software, a wide-area communication processor Wn configured to execute processing relevant to transmission and reception of data to and from the wide-area communicator 11, and a narrow-area communication processor Nn configured to execute processing relevant to transmission and reception of data to and from the narrow-area communicator 12.

The internal processor Fn includes, as more detailed functional blocks, a function provision section F1, an acquisition target detection section F2, an acquisition status management section F3, and a program implementation section F4. The wide-area communication processor Wn includes, as more detailed functional blocks, a reporting section W1, a server requesting section W2, and a server response acquisition section W3. The narrow-area communication processor Nn includes, as more detailed functional blocks, a narrow-area line acquisition section N1, a narrow-area request reception section N2, and distribution processing section N3.

Part or all of the functional blocks of the controller 13 may be implemented as hardware. Examples of such an aspect of implementing as hardware include an aspect of implementing by means of a single or a plurality of ICs. The function provision section F1 is configured to execute software stored in the flash memory to provide a predetermined function corresponding to the software. The function provision section F1 corresponds to an application layer in an ordinary computer.

The acquisition target detection section F2 is configured to detect data (hereinafter, referred to as an acquisition target data) to be acquired by the subject apparatus. The acquisition target data corresponds to an update program of software in the present embodiment. The acquisition target detection section F2 according to the present embodiment is configured to detect presence of an update program as acquisition target data in accordance with release notification distributed from the server 2. The release notification herein is a communication packet as notification of availability of an update program of software. The release notification may also include an acquisition deadline of such data.

When the acquisition target detection section F2 detects presence of an unacquired update program on the basis of release notification distributed from the server 2, the acquisition target detection section F2 adds the update program to an acquisition target list. The acquisition target list includes acquisition target data. If there is any acquisition target data, the controller 13 executes data acquisition processing to be separately described later.

The acquisition target detection section F2 may detect presence of acquisition target data by executing processing of inquiring as to whether an update program of software is released in cooperation with the wide-area communication processor Wn in a predetermined checking cycle. The communication packet, which is generated and transmitted by the wide-area communication processor Wn as an inquiry as to whether an update program of software is released, will also be called an update query for convenience. Detection of acquisition target data corresponds to determination as to whether there is any acquisition target data from a different viewpoint.

The acquisition status management section F3 is configured to manage an acquisition status of acquisition target data detected by the acquisition target detection section F2. The acquisition status of the acquisition target data is set to unacquired upon detection by the acquisition target detection section F2. The acquisition status is set to acquired if the acquisition target data has been acquired through data acquisition processing to be described later. When the acquisition target data has been acquired, such an acquired state may be managed as an internal state by deleting a column of the data from the acquisition target list. The program implementation section F4 is configured to use (in other words, apply) an update program acquired from the server 2 or the like.

The reporting section W1 is configured to report, to the server 2, a current position of the subject apparatus, an acquisition status of acquisition target data, and the like. For example, the reporting section W1 executes position reporting processing in a predetermined reporting cycle. The position reporting processing includes sequentially transmitting, to the server 2 via the wide-area communication network 3, a communication packet (hereinafter, referred to as a position reporting packet) indicating a current position of the subject apparatus. The reporting cycle may be preferably set to a value within several seconds, such as 200 milliseconds or one second.

The position reporting packet includes positional information indicating a current position of the equipped vehicle, as well as transmitter information indicating the in-vehicle apparatus 1 that has transmitted corresponding data, and additional information such as time of generation of the data. The transmitter information is identification information (that is, the apparatus ID) preliminarily assigned to the in-vehicle apparatus 1 as the transmitter for distinction from the different in-vehicle apparatus 1. Such additional information may be added at a header or the like of a communication packet serving as a position reporting packet.

The position reporting packet according to a more preferable aspect of the present embodiment is assumed to also include data indicating travel speed (in other words, moving speed) of the subject vehicle, data indicating orientation as a travel direction, and data indicating an operation state of the direction indicator. The data indicating orientation as a travel direction and the data indicating an operation state of the direction indicator correspond to data indicating a moving direction of the in-vehicle apparatus 1 as the transmitter. The data indicating the moving direction is not limited to data indicating absolute orientation. The data indicating the moving direction may indicate a scheduled travel route from a current position to a destination set by a user.

The server requesting section W2 is configured to transmit a communication packet (hereinafter, referred to as a distribution requesting packet) as a request for distribution of acquisition target data. The functional blocks of the controller 13 will be separately described in detail later.

(Configuration of Server 2)

Figure 4:
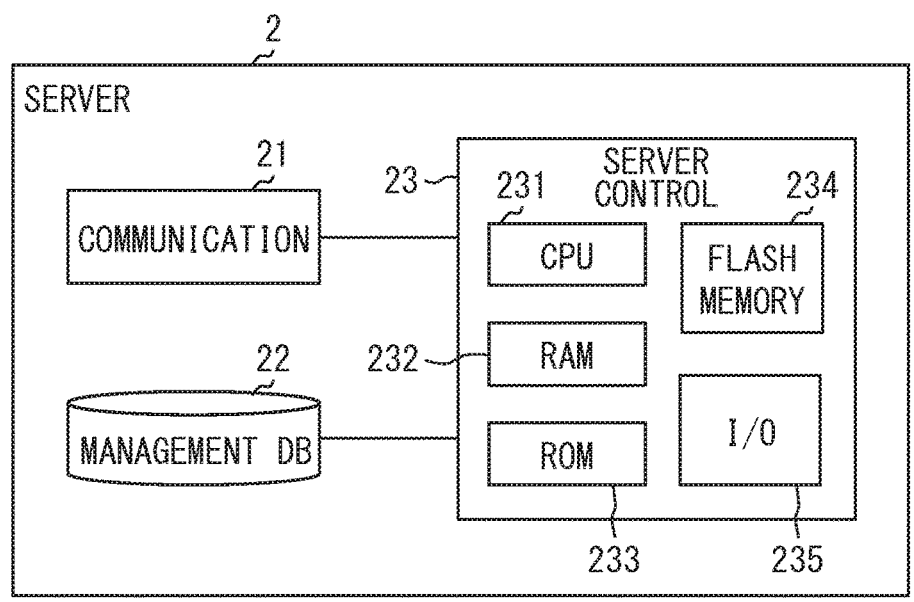
FIG. 4 is a block diagram depicting a configuration of a server.

The server 2 will be described next in terms of its configuration. As depicted in FIG. 4, the server 2 includes a server communicator 21, a management database (hereinafter, referred to as a management DB) 22, and a server controller 23. The server communicator 21 is connected to the wide-area communication network 3 and functions as a communication module configured to communicate with various external apparatuses (for example, the in-vehicle apparatus 1). The server 2 according to an aspect of the present embodiment is exemplarily wiredly connected to the wide-area communication network 3, but the server 2 is not limited to this aspect. The server 2 may alternatively be configured to be wirelessly connected to the wide-area communication network 3. The server 2 may be implemented by a plurality of computers. The server 2 may be a virtually implemented server (so-called virtual server). The server 2 can be implemented by means of the cloud computing technology or the like.

The server communicator 21 receives a communication packet addressed to the server 2 and provides the server controller 23 with data thus received. The server communicator 21 receives a position reporting packet, a distribution requesting packet, an update query, and the like. The server communicator 21 modulates data received from the server controller 23 and transmits the modulated data to a single or a plurality of in-vehicle apparatus 1. The server communicator 21 transmits release notification, an update program, and the like.

Assume that the server 2 is configured to be distinctively adaptable to unicast, multicast, and broadcast as data transmission systems. Unicast is a data transmission system with one specific in-vehicle apparatus 1 as a destination. Multicast is a data transmission system with a plurality of specific in-vehicle apparatus 1 as destinations. Broadcast is a data transmission system with all the in-vehicle apparatus 1 as addressees. Unicast is adopted in an exemplary case of transmitting response to each of the in-vehicle apparatus 1. To the contrary, multicast or broadcast is adopted in another exemplary case of distributing release notification.

Figures 5, 6:
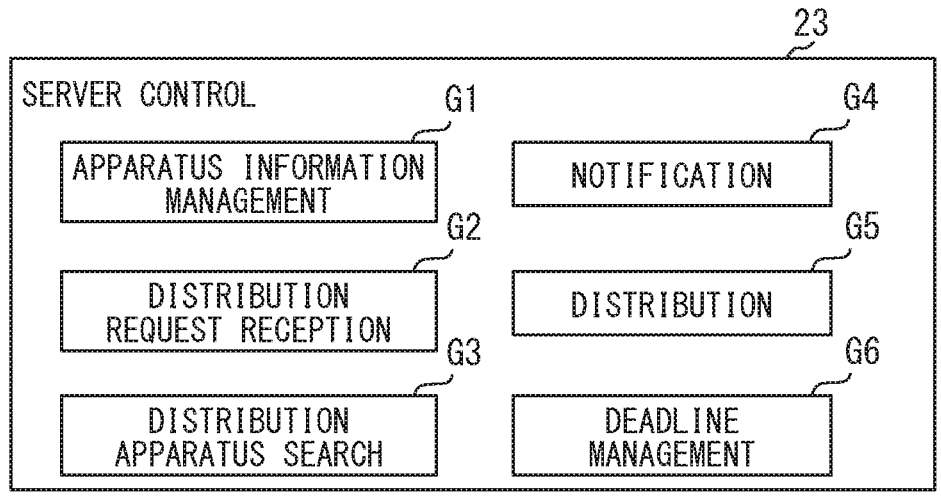
FIG. 5 is an explanatory chart of individual status data stored in a management database.
FIG. 6 is a functional block diagram depicting a configuration of a server controller.

The management DB 22 is implemented by a rewritable nonvolatile storage medium. The management DB 22 is configured to allow the server controller 23 to write, read, or delete data. The management DB 22 stores positional information on each of the in-vehicle apparatus 1 and data (hereinafter, referred to as an individual status data) indicating acquisition statuses of an update program, in correspondence with the apparatus IDs. For example, the individual status data on each of the in-vehicle apparatus 1 may be stored in an appropriate data structure such as a list form. FIG. 5 schematically depicts individual status data on each of the in-vehicle apparatuses 1 stored in the management DB 22. The following description exemplarily assumes that apparatus IDs 101, 102, and 103 are assigned to the vehicles Ma, Mb, and Mc, respectively. FIG. 5 includes various information in correspondence with the apparatus ID=101 indicating individual status data on the vehicle Ma. The data acquisition status has a column including a symbol of a circle indicating acquired and a symbol of a cross indicating unacquired.

The server controller 23 is configured to control operation of the server 2. The server controller 23 is configured as a computer including a CPU 231, a RAM 232, a ROM 233, a flash memory 234, an I/O 235, bus lines connecting these elements, and the like. The flash memory 234 stores a program (hereinafter, referred to as a distribution control program) causing an ordinary computer to function as the server controller 23.

The distribution control program only has to be stored in a non-transitory tangible storage medium, which is not specifically limited to the flash memory 234. Specific examples of the storage medium include a substantial storage medium (for example, hard disk drive (HDD)) and exclude a transmission medium such as light or an electromagnetic wave. Execution of the distribution control program by the CPU 231 corresponds to execution of a method according to the distribution control program.

When the CPU 231 executes the distribution control program stored in the flash memory 234, the server controller 23 provides various functions indicated in FIG. 6. Specifically, the server controller 23 includes an apparatus information management section G1, a distribution request reception section G2, a distribution apparatus searching section G3, a notification section G4, a distribution section G5, and a deadline management section G6.

The apparatus information management section G1 updates positional information on each of the in-vehicle apparatus 1 and the like stored in the management DB 22 on the basis of position reporting packets transmitted from the in-vehicle apparatus 1. Each time the server communicator 21 receives a position reporting packet, the apparatus information management section G1 updates positional information, moving speed, a travel direction, and an operation state of the direction indicator, of the transmitter of the communication packet, which are stored in the management DB 22.

The distribution request reception section G2 is configured to receive a distribution request for an update program from any of the in-vehicle apparatus 1. The distribution request reception section G2 specifies the in-vehicle apparatus 1 (hereinafter, referred to as a requester apparatus) as a requester in accordance with the apparatus ID indicated in the distribution requesting packet received by the server communicator 21. Data (that is, requested data) requested for distribution from the in-vehicle apparatus 1 to the server 2 corresponds to acquisition target data for the in-vehicle apparatus 1 as the requester.

The remaining functional blocks of the server controller 23 are schematically described as follows and will be separately described in detail later. The distribution apparatus searching section G3 is configured to determine whether the requester apparatus can acquire acquisition target data from any different one of the in-vehicle apparatus 1 via narrow-area communication, on the basis of the data acquisition status of each of the different in-vehicle apparatus 1 positioned around the requester apparatus. The distribution apparatus searching section G3 corresponds to the peripheral apparatus search section according to the present disclosure.

The notification section G4 is configured to notify the requester apparatus that acquisition target data can be acquired via narrow-area communication on the basis of determination by the distribution apparatus searching section G3 that the requester apparatus can acquire the acquisition target data from one of the different in-vehicle apparatus 1 via narrow-area communication. The distribution section G5 is configured to distribute the acquisition target data to the requester apparatus when the distribution apparatus searching section G3 determines that the requester apparatus cannot acquire the acquisition target data from the different in-vehicle apparatus 1 via narrow-area communication.

A state where acquisition target data cannot be acquired via narrow-area communication may include a state where acquisition is difficult. Examples of the state where acquisition of acquisition target data is difficult via narrow-area communication include a case where there is no peripheral different apparatus that can distribute the data readily, and a case where remaining communicable time is insufficient for time necessary for data distribution even if there is any different apparatus.

The notification section G4 may notify the requester apparatus more specifically with a reason for acquisition difficulty such as that there is no peripheral different apparatus that can readily distribute the data or that there is no different apparatus shortly becoming distributable. A communication packet transmitted from the notification section G4 and indicating acquirability of acquisition target data via narrow-area communication will also be called narrow-area acquirability notification for convenience.

The present embodiment exemplifies constantly transmitting narrow-area acquisition notification if the distribution apparatus searching section G3 determines that the requester apparatus can acquire acquisition target data from one of the different in-vehicle apparatus 1 via narrow-area communication. The present disclosure is, however, not limited to this embodiment. Depending on a crowded status in the wide-area communication network and request contents from the requester apparatus, the distribution section G5 may be configured to distribute requested data without transmitting narrow-area acquirability notification even when there is a different apparatus storing the requested data around the requester apparatus. In an exemplary case of receiving, from the requester apparatus, a distribution request for acquisition via wide-area communication, requested data may be distributed via wide-area communication even when there is a different apparatus storing the requested data around the requester apparatus. The server 2 only has to have a function of executing distribution control processing of causing the requester apparatus to acquire requested data via narrow-area communication, by transmitting a predetermined command signal to at least one of the requester apparatus and the peripheral already-acquiring apparatus including a representative distributor apparatus.

The deadline management section G6 is configured to manage a data acquisition status of the in-vehicle apparatus 1 (hereinafter, referred to as an already-requesting apparatus) that once transmitted a distribution requesting packet. The deadline management section G6 refers to remaining time to an acquisition deadline of the already-requesting apparatus and sequentially determines whether the remaining time to the acquisition deadline is sufficient. If the acquisition deadline is already past or if there is any already-requesting apparatus having remaining time to the acquisition deadline less than a predetermined threshold, the deadline management section G6 distributes requested data to the apparatus via wide-area communication in cooperation with the distribution section G5. Such a configuration allows the in-vehicle apparatus 1 to eventually acquire acquisition target data via wide-area communication. This inhibits continuation of a state where the in-vehicle apparatus 1 cannot acquire acquisition target data.

(Data Acquisition Processing)

Data acquisition processing executed by the controller 13 will be described next with reference to FIG. 7. The data acquisition processing is executed for acquisition of acquisition target data detected by the acquisition target detection section F2. The data acquisition processing depicted in FIG. 7 may start at exemplary timing when the acquisition target detection section F2 detects presence of acquisition target data. The data acquisition processing may alternatively start if a predetermined request execution condition is satisfied in a state where there is acquisition target data.

The request execution condition may be exemplarily set such that predetermined time has not passed yet after turning ON a travel power source such as an ignition power source. Such setting will cause the flow to start immediately after the subject vehicle stats travelling. This inhibits a state where the travel power source is turned OFF to stop the flow immediately after the flow starts and a state where a battery is exhausted due to consumption of a battery power source for continuous execution of the flow.

Remaining time (hereinafter, referred to as a trip continuation time) until the ignition power source is turned OFF may be estimated from a positional relation between the destination set by the user and a current position, and the request execution condition may include that the trip continuation time is equal to or more than a predetermined threshold. Such setting will also exhibit effect similar to the above.

The request execution condition may further include that a scheduled travel route determined from the positional relation between the destination set by the user and a current position includes a type of a road expected to have relatively high vehicle traffic such as a national road. In such an aspect, the subject vehicle highly possibly travels along with or passes by a large number of different vehicles (in other words, different apparatuses) before termination of travel, as to be described later. This increases possibility of acquiring acquisition target data via narrow-area communication. The request execution condition may further include that the travel power source of the subject vehicle is turned OFF.

This data acquisition processing is executed by the controller 13 in cooperation (in other words, collaboration) with the wide-area communicator 11 and the narrow-area communicator 12. Initially in S101 of the data acquisition processing, the server requesting section W2, in collaboration with the wide-area communicator 11, transmits a distribution requesting packet to the server 2, and the flow then proceeds to S102. Assume that, as exemplarily depicted in FIG. 8, the distribution requesting packet includes an apparatus ID as the transmitter information, acquisition target information, and an acquisition deadline.

The acquisition target information is referred to by the server 2 for specification of data requested by the in-vehicle apparatus 1. The acquisition target information may have any contents as long as the information enables the above object. In an exemplary case where acquisition target data includes any identification number such as a release number, the identification number can be adopted as the acquisition target information. The acquisition target information is information (so-called metadata) on acquisition target data from a different viewpoint. The acquisition target information also relates to a type, a version number, a released date, and the like of software.

Acquisition deadline information indicates an acquisition deadline of acquisition target data. The acquisition deadline is set by the controller 13 in accordance with a type of the acquisition target data. When release notification includes a set acquisition deadline, the set deadline may be adopted. That is, the acquisition deadline may be set by the server 2. The acquisition deadline information is not an essential constituent element of a distribution requesting packet. The distribution requesting packet only has to include transmitter information and acquisition target information. The acquisition deadline may be expressed by a date and time, or may be expressed by time elapsed after transmission of a distribution requesting packet.

Response from the server 2 is received in S102, and processing in S103 is then executed. S103 includes determining whether narrow-area acquirability notification is received as response from the server 2. Positive determination is made in S103 in a case where the data received in S102 is narrow-area acquirability notification, and processing in S104 is then executed. Processing in S107 is executed in another case where the data received in S102 is not narrow-area acquirability notification, in other words, if the data received in S102 is acquisition target data itself.

In S104, the narrow-area line acquisition section N1 broadcast-transmits, in collaboration with the narrow-area communicator 12, a communication packet (hereinafter, referred to as a narrow-area requesting packet) as a request for transmission of acquisition target data to the different in-vehicle apparatus 1. The flow then proceeds to S105. The narrow-area requesting packet is assumed to include acquisition target information, similarly to a distribution requesting packet transmitted to the server 2.

In S105, the narrow-area line acquisition section N1 determines whether acquisition target data is transmitted (in other words, received) from any one of the different in-vehicle apparatus 1 via narrow-area communication. The narrow-area line acquisition section N1 is configured to acquire acquisition target data from any of the different in-vehicle apparatus 1 via narrow-area communication. When positive determination is made in S105 in a case where the acquisition target data is received from the different in-vehicle apparatus 1 via narrow-area communication, processing in S106 is then executed.

When negative determination is made in S105 in another case where the acquisition target data is not received although predetermined response standby time elapses after transmission of the narrow-area requesting packet in S104, processing in S109 is then executed. The response standby time may be set from several seconds to several minutes. The narrow-area line acquisition section N1 may transmit the narrow-area requesting packet at a predetermined request interval during the response standby time. A time point (in other words, measurement start point) of starting measurement of the response standby time may be set at first transmission of the narrow-area requesting packet in this case. The request interval may be set to a value not exceeding a half of the response standby time. The request interval may be exemplarily set between about 100 milliseconds and several seconds. In a case where the response standby time is set to two seconds, the request interval may be set to about 400 milliseconds.

Data received in S105 is stored in S106, and the flow then proceeds to S108. Acquisition target data transmitted from the server 2 is stored in S107, and processing in S108 is then executed. The acquisition status is changed to acquired in S108, and the flow then proceeds to S109. The reporting section W1 transmits acquisition success notification to the server 2 in S109, and the flow terminates. The acquisition success notification is a communication packet as a report of acquisition of acquisition target data to the server 2.

When an update program is acquired as acquisition target data via wide-area communication or narrow-area communication, the update program thus received may be applied (in other words, installed) at appropriately set timing. In an exemplary case of an update program of software of a type not influencing vehicle travel control, application processing may start upon receipt. The application processing may be executed at timing set by the user (for example, when the travel power source is turned OFF). An update program not necessary any more after application to software itself may be deleted at predetermined timing. For example, the update program may be stored for one month and then be deleted. Deletion timing may be determined by the controller 13 in accordance with volume of data stored in the flash memory 134, or may be set by the server 2.

The reporting section W1 transmits acquisition failure notification to the server 2 in S110, and the flow terminates. The acquisition failure notification is a communication packet as a report to the server 2 of failed acquisition of acquisition target data via narrow-area communication. The flow terminates when processing in S110 completes. If acquisition target data is not acquired via narrow-area communication, the acquisition status of the acquisition target data remains unacquired upon termination of the flow.

If acquisition target data is not acquired after execution of the data acquisition processing, the controller 13 executes the data acquisition processing again after certain time elapses. The data acquisition processing is executed in a predetermined cycle until the acquisition target data is acquired.

(Distribution Request Response Processing)

Figure 9:
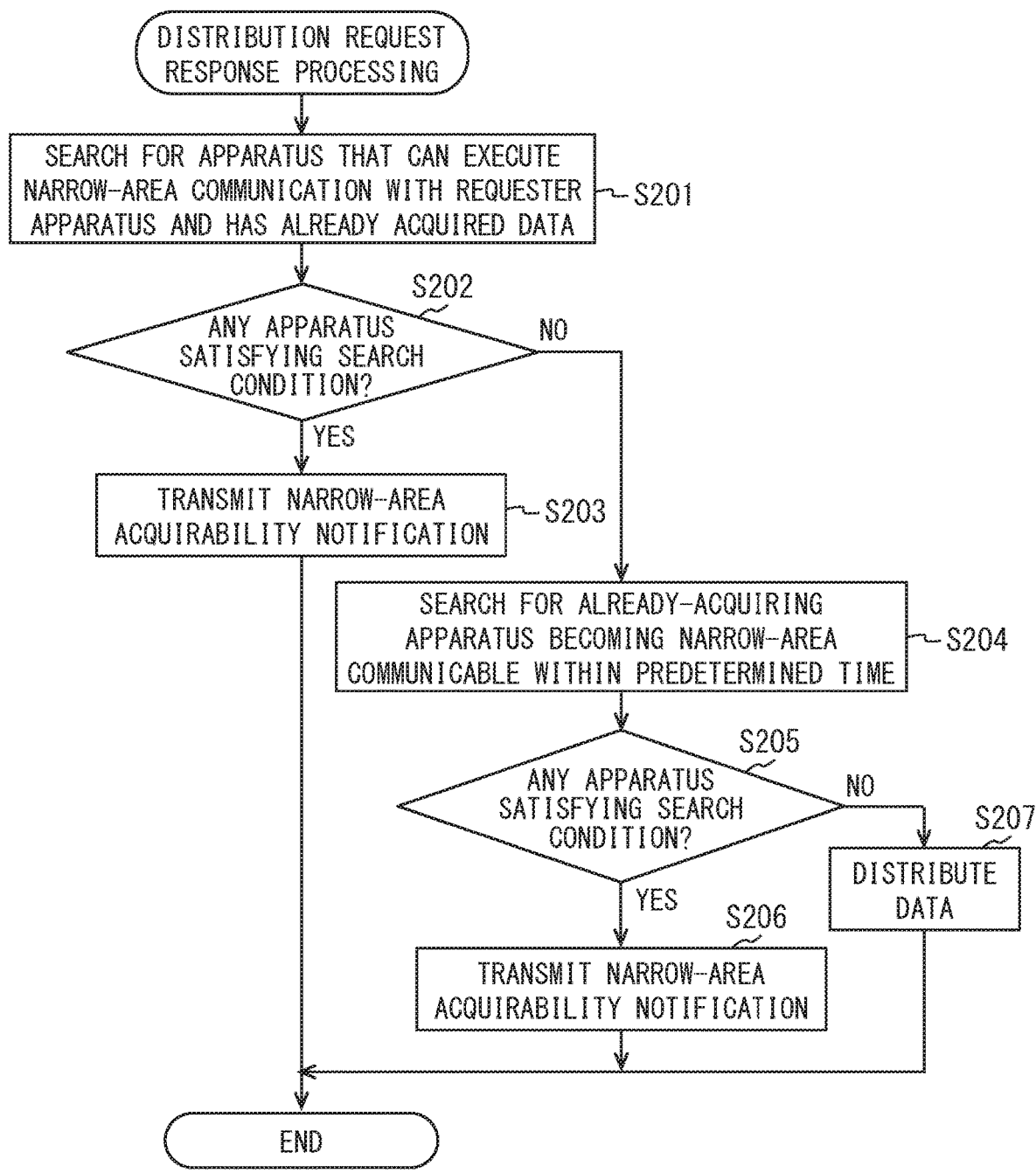
FIG. 9 is a flowchart of distribution request response processing executed by the server controller.

Distribution request response processing executed by the server controller 23 will be described next with reference to FIG. 9. The distribution request response processing is executed in response to a distribution request from the in-vehicle apparatus 1. The distribution request response processing depicted in FIG. 9 may be sequentially executed each time the distribution request reception section G2 receives a distribution request from the in-vehicle apparatus 1 on the basis of distribution requesting packet received by the server communicator 21.

Initially in S201, the distribution apparatus searching section G3 refers to the management DB 22 to search for the in-vehicle apparatus 1 that is currently positioned to be narrow-area communicable with the requester apparatus and has already acquired data (that is, requested data) requested by the requester apparatus. Requested data corresponds to acquisition target data for the requester apparatus, as described earlier.

The time point specified by the expression currently (in other words, the current time point) in this case indicates a time point of receipt of a distribution request from the in-vehicle apparatus 1. An already-acquiring apparatus currently positioned within a narrow-area communicable range with the requester apparatus corresponds to the in-vehicle apparatus 1 that can distribute requested data via narrow-area communication upon receipt of a distribution request by the server 2. Accordingly, the already-acquiring apparatus currently positioned within the narrow-area communicable range with the requester apparatus will also be hereinafter called a promptly distributable apparatus.

The promptly distributable apparatus may be exemplarily assumed as the in-vehicle apparatus 1 positioned within a predetermined narrow-area communicable distance Rn (unit: meter) from a current position of the requester apparatus. The narrow-area communicable distance Rn is several hundred meters such as 150 meters. The narrow-area communicable distance Rn is set to have an estimated value of a communicable distance of the narrow-area communicator 12. The narrow-area communicable distance Rn can be set to be software-shorter than an actual radio wave propagation distance.

The apparatus that has already acquired requested data is further extracted from such apparatuses. The in-vehicle apparatus 1 that has already acquired requested data may include the in-vehicle apparatus 1 that is currently acquiring the data via wide-area communication. Such an in-vehicle apparatus 1 is expected to have been already acquired the data before the requester apparatus transmits a narrow-area requesting packet. The in-vehicle apparatus 1 that has already acquired requested data will also be called the already-acquiring apparatus for convenience.

In a case where there is found the in-vehicle apparatus 1 satisfying a search condition after search processing in S201, positive determination is made in S202 and processing in S203 is then executed. In another case where there is found no in-vehicle apparatus 1 satisfying the search condition after the search processing in S201, negative determination is made in S202 and processing in S204 is then executed.

Processing in S201 and S202 corresponds to processing of determining whether there is any in-vehicle apparatus 1 that has already acquired requested data (that is, promptly distributable apparatus) within the narrow-area communicable range of the requester apparatus. The notification section G4 transmits narrow-area acquirability notification to the requester apparatus in S203, and the flow then terminates.

In S204, the distribution apparatus searching section G3 refers to the management DB 22 to search for any already-acquiring apparatus possibly becoming narrow-area communicable soon with the requester apparatus. The already-acquiring apparatus possibly becoming narrow-area communicable soon with the requester apparatus has a decreasing distance from (is approaching) at least the in-vehicle apparatus 1 as the requester apparatus. The already-acquiring apparatus possibly becoming narrow-area communicable with the requester apparatus will also be hereinafter called a shortly distributable apparatus.

As exemplarily depicted in FIG. 10, the shortly distributable apparatus is an already-acquiring apparatus that is positioned in the moving direction of the requester apparatus on a road (hereinafter, referred to as a requester travelling route) R1 along which the requester apparatus is moving, and is also moving toward the requester apparatus. The shortly distributable apparatus corresponds to the different apparatus mounted on an oncoming vehicle for the vehicle (requester vehicle) M1 equipped with the requester apparatus. The shortly distributable apparatus may also correspond to the already-acquiring apparatus mounted on the vehicle M3 or M4 travelling on a road (hereinafter, referred to as a joint route) R2 connected to an intersection located ahead of the requester apparatus on the requester travelling route.

The already-acquiring apparatus to be extracted may be preferably distant at most by the narrow-area communicable distance Rn from the requester apparatus within predetermined allowable delay time. Whether a certain in-vehicle apparatus 1 is distant from the requester apparatus at most by the narrow-area communicable distance Rn within predetermined time can be estimated from a current position, a travel direction, and moving speed of each of the in-vehicle apparatus 1. Whether to be distant at most by the narrow-area communicable distance Rn within the predetermined time may be preferably estimated in consideration of the operation state of the direction indicator in each of the vehicles. A method of estimating whether distance between two vehicles becomes equal to or less than predetermined distance within predetermined time can be achieved with invocation of a method for estimating possibility of collision or the like, and will thus not be described in detail herein. The allowable delay time may be set in accordance with the acquisition deadline. The allowable delay time may be preferably set to a value not exceeding a half of the acquisition deadline.

In a case where there is found any shortly distributable apparatus after search processing in S204, positive determination is made in S205 and processing in S206 is then executed. In another case where there is found no shortly distributable apparatus after the search processing in S204, negative determination is made in S205 and processing in S207 is then executed. Processing in S204 and S205 corresponds to processing of determining whether there is any shortly distributable apparatus.

The already-acquiring apparatuses positioned around the requester according to the present disclosure may also include the shortly distributable apparatus extracted in S204. The promptly distributable apparatus extracted in S202 is obviously also included in the already-acquiring apparatuses positioned around the requester according to the present disclosure. When the promptly distributable apparatus and the shortly distributable apparatus are not distinguished from each other, these apparatuses will be hereinafter called peripheral already-acquiring apparatuses for convenience.

The notification section G4 transmits narrow-area acquirability notification to the requester apparatus in S206, and the flow then terminates. The narrow-area acquirability notification transmitted in S206 preferably includes information indicating remaining time (hereinafter, referred to as a narrow-area request standby time) until data acquisition via narrow-area communication becomes possible. Such notification causes the requester apparatus to recognize that acquisition target data cannot be currently acquired via narrow-area communication.

In view of the above, the present embodiment assumes that the narrow-area acquirability notification transmitted by the notification section G4 in S203 and S206 includes the narrow-area request standby time as well as destination information via wide-area communication and a bit string indicating acquirability via narrow-area communication, as depicted in FIG. 11. The destination information indicates a target of a communication packet among the plurality of in-vehicle apparatus 1. The narrow-area acquirability notification may obviously include the destination information as well as information indicating a transmitter, and the like. The bit string indicating acquirability via narrow-area communication has a specific bit pattern indicating narrow-area communicability. In other words, the bit string allows the requester apparatus to recognize that a received communication packet corresponds to narrow-area acquirability notification.

The request standby time may be set as remaining time (hereinafter, referred to as a connection required time) until the shortly distributable apparatus and the requester apparatus are distant from each other by at most the narrow-area communicable distance Rn. If there is a plurality of shortly distributable apparatuses, the request standby time may be set to the minimum value of the connection required time for each of the shortly distributable apparatuses. As described earlier, the connection required time for a certain shortly distributable apparatus can be calculated from a current position, a travel direction, and moving speed of each of the in-vehicle apparatus 1.

The requester apparatus having acquired narrow-area acquirability notification is assumed to transmit a narrow-area requesting packet upon elapse of the request standby time indicated in the narrow-area acquirability notification from a measurement start point upon receipt of the narrow-area acquirability notification. In an exemplary case where the requester apparatus receives narrow-area acquirability notification provided with five seconds set as the request standby time, the requester apparatus broadcast-transmits a narrow-area requesting packet after five seconds from receipt of the narrow-area acquirability notification.

The narrow-area acquirability notification transmitted in a case where there is any promptly distributable apparatus, that is, the narrow-area acquirability notification transmitted in S203, indicates narrow-area request standby time that may be set to zero seconds. The requester apparatus having received narrow-area acquirability notification having zero seconds set as the request standby time is to promptly broadcast-transmit a narrow-area requesting packet upon receipt of the narrow-area acquirability notification. Adding request standby time to narrow-area acquirability notification enables control of timing of broadcast-transmission of a narrow-area requesting packet by the requester apparatus.

The distribution section G5 transmits requested data in S207, and the flow then terminates. The server 2 according to the present embodiment executes data distribution via wide-area communication if there is no peripheral already-acquiring apparatus. As described earlier, the server 2 according to the present embodiment determines that there is no peripheral already-acquiring apparatus when there is no in-vehicle apparatus 1 that has already acquired requested data within the narrow-area communicable range of the requester apparatus (that is, a promptly distributable apparatus) and there is no already-acquiring apparatus possibly becoming narrow-area communicable with the requester apparatus (that is, a shortly distributable apparatus).

According to a different aspect, determination that there is no peripheral already-acquiring apparatus may be made upon no presence of any promptly distributable apparatus, and data distribution may be executed via wide-area communication. Such an aspect corresponds to an aspect in which only the narrow-area communicable range of the requester apparatus is regarded as the periphery of the requester apparatus.

When data distribution is executed via wide-area communication in S207, the apparatus information management section G1 changes the data acquisition status of the requester apparatus registered in the management DB 22 from unacquired to acquired. The data acquisition status of the requester apparatus is updated on the basis of an operation result of the distribution section G5. Also upon receipt of acquisition success notification from the requester apparatus, the apparatus information management section G1 changes the data acquisition status of the requester apparatus registered in the management DB 22 from unacquired to acquired.

Upon receipt of acquisition failure notification from the requester apparatus, the apparatus information management section G1 keeps unacquired, the data acquisition status of the requester apparatus registered in the management DB 22.

(Narrow-Area Request Response Processing)

Narrow-area request response processing executed by any of the in-vehicle apparatus 1 will be described next with reference to FIG. 12. The narrow-area request response processing includes replying to a distribution request transmitted from the in-vehicle apparatus 1 via narrow-area communication. The narrow-area request response processing may be sequentially executed each time the narrow-area request reception section N2 receives a distribution request from the different in-vehicle apparatus 1 on the basis of a narrow-area requesting packet received by the narrow-area communicator 12. The narrow-area request reception section N2 is configured to receive a data distribution request from the different in-vehicle apparatus 1 on the basis of receipt of a narrow-area communication packet. The narrow-area request reception section N2 refers to acquisition target information included in the narrow-area requesting packet to specify data (hereinafter, referred to as a requested data) requested by the requester apparatus.

Initially in S301, the acquisition status management section F3 determines whether the subject apparatus stores the requested data specified by the narrow-area request reception section N2. A state of storing requested data corresponds to a state where the requested data has already been acquired and has not been deleted yet. In other words, a state of not storing requested data corresponds to a state where the requested data is unacquired or has already been deleted. Processing in S302 is executed in a case where the subject apparatus stores the requested data. The flow terminates in another case where the subject apparatus does not store the requested data. When the subject apparatus does not store the requested data, the subject apparatus may return, via narrow-area communication, a communication packet indicating storage of no requested data.

In S302, the distribution processing section N3 executes, in cooperation with the narrow-area communicator 12, broadcasting the requested data or unicasting to the requester apparatus, and the flow then terminates.

In the configuration described above, in a case where there is any different apparatus that has already acquired requested data and positioned around the requester apparatus (that is, the already-acquiring apparatus), the server 2 notifies acquirability of the acquisition target data via narrow-area communication, and does not distribute the requested data via wide-area communication at this timing. Only in another case where there is no already-acquiring in-vehicle apparatus 1 around the requester apparatus, the server 2 executes data distribution via wide-area communication. This inhibits possibility of acquisition of acquisition target data via wide-area communication by the in-vehicle apparatus 1, for reduction of communication fees and the like.

The embodiment of the present disclosure has been described above. The present disclosure should not be limited to the above embodiment, but has a technical scope including various modifications to be described hereinafter and can also be implemented with various changes not described below within a scope not departing from the purpose of the present disclosure.

Members having a function identical to that of the members described in the above embodiment will be denoted by identical reference signs and will not be described repeatedly. In a case where only part of any configuration is described, the preceding embodiment is applicable to the remaining part of the configuration.

First Modification

According to the embodiment described above, the server 2 notifies, as narrow-area acquirability notification, simply acquirability via narrow-area communication (including expectation) without assigning any different apparatus from which requested data is to be acquired via narrow-area communication. The requester apparatus thus requests the peripheral in-vehicle apparatus 1 to transmit acquisition target data by means of broadcast-transmission of a narrow-area requesting packet. In a case where there is a plurality of promptly distributable apparatuses in such an aspect, the plurality of in-vehicle apparatus 1 transmits identical data in response to the narrow-area requesting packet thus broadcast-transmitted, which leads to crowded radio waves for narrow-area communication and may affect a different system.

The server 2 according to a different aspect may thus assign, in the narrow-area acquirability notification, one of the in-vehicle apparatus 1 from which requested data is to be acquired. In this case, the narrow-area acquirability notification is assumed to include, in addition to destination information and the like, assigned apparatus information causing the requester apparatus to assign the in-vehicle apparatus 1 (hereinafter, referred to as a assigned apparatus) designated by the server 2. The assigned apparatus information may include the apparatus ID of the assigned apparatus. The requester apparatus having received the narrow-area acquirability notification executes unicast narrow-area communication with the assigned apparatus indicated in the narrow-area acquirability notification to achieve request and acquisition of data. Such a configuration according to the aspect inhibits crowded radio waves for narrow-area communication due to transmission of identical data from the plurality of in-vehicle apparatus 1 in response to a narrow-area requesting packet having been broadcast-transmitted.

Second Modification

The in-vehicle apparatus 1 acquires acquisition target data via narrow-area communication in a manner not limited to the method described above. When finding presence of an already-acquiring apparatus through searching in the management DB 22, the server 2 may command the requester apparatus to stand by for predetermined time and may command the specific in-vehicle apparatus 1 as a peripheral already-acquiring apparatus to transmit requested data to the requester apparatus via narrow-area communication.

FIG. 13 is a flowchart depicting a flow of distribution request response processing (in other words, operation of the server controller 23) on the basis of this idea. The distribution request response processing depicted in FIG. 13 may be executed each time a distribution requesting packet is received. Parts already described with reference to the flowchart in FIG. 9 will not be described repeatedly or will be described schematically.

Initially in S401, the distribution apparatus searching section G3 determines whether there is any peripheral already-acquiring apparatus. Processing in S402 is executed in a case where there is any peripheral already-acquiring apparatus. Processing in S405 is executed in another case where there is no peripheral already-acquiring apparatus.

In S402, the notification section G4 returns, to the requester apparatus, narrow-area acquirability notification commanding standby until receiving requested data via narrow-area communication for predetermined time, and then executes processing in S403. A communication packet as the narrow-area acquirability notification commanding standby until receiving requested data via narrow-area communication corresponds to the narrow-area reception standby command according to the present disclosure.

Standby time commanded by means of the narrow-area acquirability notification transmitted in S402 may be obtained by adding predetermined spare time to remaining time until the representative distributor apparatus to be determined in the following step becomes narrow-area communicable with the requester apparatus. Upon receipt of the narrow-area acquirability notification, the requester apparatus stands by for the standby time commanded by means of the narrow-area acquirability notification, until distribution of acquisition target data from any of the different in-vehicle apparatus 1. The requester apparatus may transmit acquisition failure notification to the server 2 if the acquisition target data has not been received after elapse of the standby time.

In S403, the distribution apparatus searching section G3 determines an apparatus (that is, representative distributor apparatus) expected to distribute data to the requester apparatus, out of the peripheral already-acquiring apparatuses. In a case where there is only one peripheral already-acquiring apparatus, this apparatus may be determined as the representative distributor apparatus. In another case where there is a plurality of peripheral already-acquiring apparatuses, the representative distributor apparatus is selected in accordance with a predetermined rule. The representative distributor apparatus may be the already-acquiring apparatus closest to the requester apparatus, or may be the already-acquiring apparatus having longest narrow-area communicable time with the requester apparatus. Examples of the apparatus having the longest narrow-area communicable time include a different apparatus moving in the identical direction along with the requester apparatus, and an apparatus having small relative speed. The narrow-area communicable time corresponds to time of staying within a narrow-area communicable area of the requester apparatus. The narrow-area communicable time can be calculated from a current position, a travel direction, and moving speed of each of the in-vehicle apparatus 1. Processing in S404 is executed after processing in S403 completes.

Data acquisition from a representative distributor apparatus succeeds or fails depending on route change by the representative distributor apparatus, an exit from the narrow-area communicable range, and the like. In other words, data acquisition from the representative distributor apparatus may fail due to behavior of the representative distributor apparatus. Specifically, such difficulty is significant when requested data has a short acquisition deadline and when the representative distributor apparatus is moving at high speed. In view of this, when the already-acquiring apparatus closest to the requester apparatus is selected as the representative distributor apparatus as described above, data acquisition is less likely to be influenced by route change by the representative distributor apparatus, an exit from the narrow-area communicable range, and the like. This configuration leads to highly successful indirect data distribution via narrow-area communication, with less influence by movement of the representative distributor apparatus.

When the already-acquiring apparatus closest to the requester apparatus is adopted as the representative distributor apparatus as described above, even if any shortly distributable apparatus is selected as the representative distributor apparatus, the representative distributor apparatus and the requester apparatus are less likely to become narrow-area communicable after the acquisition deadline.

When the already-acquiring apparatus having the longest narrow-area communicable time with the requester apparatus is adopted as the representative distributor apparatus, even if requested data is relatively large in size, data acquisition is less likely to fail due to an exit or the like of the representative distributor from the narrow-area communicable range of the subject apparatus during data communication. Acquisition of data relatively large in size via narrow-area communication needs relatively long communication time, and the data may not be acquired from the representative distributor apparatus in this case. The configuration described above inhibits such possible failure.

In S404, the notification section G4 transmits, to the representative distributor apparatus determined in S403, a communication packet (hereinafter, referred to as a narrow-area distribution command) as a command to transmit requested data via narrow-area communication. The flow then terminates. The narrow-area distribution command transmitted to the representative distributor apparatus in S404 and the narrow-area acquirability notification transmitted to the requester apparatus in S402 each correspond to a communication packet according to the present disclosure, causing the requester to acquire commonly used data from the representative distributor apparatus via narrow-area communication.

The communication packet as the narrow-area distribution command includes a data region indicating acquisition target information, similarly to the distribution requesting packet. The communication packet as the narrow-area distribution command preferably includes a data region indicating transmission standby time, in consideration of possibility that the representative distributor apparatus does not necessarily correspond to a promptly distributable apparatus. The transmission standby time may have a value corresponding to the connection required time described earlier. When the representative distributor apparatus corresponds to a promptly distributable apparatus, the transmission standby time may be set to zero seconds. The server 2 may transmit the narrow-area distribution command after finding that the representative distributor apparatus and the requester apparatus become positioned to be narrow-area communicable with each other. In this case, the narrow-area distribution command does not need to have the data region indicating the transmission standby time.

In the above configuration, the server 2 more positively controls transmission and reception of data among the in-vehicle apparatus 1, so that the requester apparatus is more likely to acquire acquisition target data via narrow-area communication.

Third Modification

The server 2 described above is configured to execute data distribution when there is no already-acquiring apparatus around the requester apparatus. The present disclosure is, however, not limited to this configuration. If there is no already-acquiring apparatus around the requester apparatus, the in-vehicle apparatus 1 positioned within an area of highest wide-area communication efficiency (hereinafter, referred to as a highly efficient area) is selected from among the in-vehicle apparatus 1 positioned within a predetermined distance (for example, the narrow-area communicable distance Rn) from a current position of the requester apparatus. Data distribution to the requester apparatus may be achieved directly or indirectly by distribution of requested data to the in-vehicle apparatus 1.

Specifically, in a case where the in-vehicle apparatus 1 positioned within the highly efficient area is not the requester apparatus, data is tentatively distributed to the in-vehicle apparatus 1 via wide-area communication. The data is then transferred via narrow-area communication to the requester apparatus from the in-vehicle apparatus 1 having received data distributed via wide-area communication. Data may be transferred to the requester apparatus from the in-vehicle apparatus 1 having received data distributed via wide-area communication in a process according to any one of the various methods described above (for example, the method according to the second modification). In another case where the in-vehicle apparatus 1 positioned within the highly efficient area is the requester apparatus, data may be distributed to the requester apparatus.

FIG. 14 is an explanatory view of operation of the server 2 according to the third modification. FIG. 14 includes an area A1 having low efficiency of wide-area communication, and an area A2 having moderate efficiency of wide-area communication. FIG. 14 further includes an area A3 having high efficiency of wide-area communication. When the requester apparatus corresponds to the in-vehicle apparatus 1a mounted on the vehicle Ma in such a communication status, data is transmitted to the in-vehicle apparatus 1c mounted on the vehicle Mc and is then transferred via narrow-area communication.

The area having low efficiency of wide-area communication includes an area having crowded resources of wide-area communication. A Wi-Fi available area has relatively high communication efficiency. Efficiency levels of wide-area communication at respective points may be acquired from a telecommunications carrier providing wide-area communication. The efficiency levels can also be specified from the communication statuses with the in-vehicle apparatus 1 (for example, S/N ratios, bit error rates, or communication delay time).

Fourth Modification

The above embodiment and the like refer to the configuration in which the server 2 distributes an update program in response to a distribution request from any one of the in-vehicle apparatus 1. The server 2 may separately distribute an update program to a predetermined in-vehicle apparatus 1 at predetermined timing (preliminarily) before receipt of a request from the in-vehicle apparatus 1.

For example, the server 2 may distribute, in a predetermined cycle, an update program to some of the in-vehicle apparatus 1 stopping in a large parking space. The in-vehicle apparatus 1 as preliminary distribution targets of the update program are assumed to be distant from each other by at least two times of the narrow-area communicable distance. The server 2 preferably selects the in-vehicle apparatus 1 as the preliminary distribution targets such that the update program can be shared via narrow-area communication without overlap or vacancy.

Fifth Modification

The server 2 described above is configured to reply individually to distribution requests from the plurality of in-vehicle apparatus 1. The present disclosure is, however, not limited to such an aspect. The server 2 may be configured to sequentially receive the distribution requests from the in-vehicle apparatus 1 and collectively reply, in a predetermined cycle (hereinafter, referred to as a response cycle), to the sequentially received distribution requests. In other words, the server 2 may be configured to accumulate distribution requests from the in-vehicle apparatus 1 until predetermined response timing, and collectively reply at the response timing to the plurality of distribution requests accumulated. The response timing comes in the response cycle. The response cycle may be appropriately set in accordance with a type of requested data. For example, the response cycle to distribution requests for an update program of software can be set to a value approximately from one minute to one hour.

For example, the distribution request reception section G2 is configured to accumulate distribution requests from the in-vehicle apparatus 1 in a predetermined storage medium. The distribution requests accumulated in this case include requested data, the apparatus IDs of the requester apparatuses, and the like. The distribution apparatus searching section G3 extracts the accumulated distribution requests in a predetermined cycle, and selects, as a representative distributor apparatus, at least one already-acquiring apparatus positioned to be capable of distributing commonly used data via narrow-area communication most efficiently (specifically, a small number of times) to requesters of the plurality of accumulated distribution requests, on the basis of positional information, moving speed, and a travel direction of each of the in-vehicle apparatus 1 stored in the management DB 22. A narrow-area distribution command is then transmitted to the representative distributor apparatus.

Such a configuration enables efficient distribution of requested data via narrow-area communication. The configuration according to the fifth modification may obviously be implemented in combination with the configuration according to the fourth modification. In an exemplary case where a certain area includes totally ten requester apparatuses and there is no already-acquiring apparatus, requested data may be distributed via wide-area communication to the in-vehicle apparatus 1 positioned to be narrow-area communicable with a larger number of requester apparatuses and the requested data may then be broadcast-distributed via narrow-area communication. If there is an in-vehicle apparatus 1 positioned to be narrow-area communicable with only three requester apparatuses and there is an in-vehicle apparatus 1 positioned to be narrow-area communicable with nine requester apparatuses, the requested data is distributed via wide-area communication to the latter to function as the representative distributor apparatus.

Sixth Modification

Figure 15:
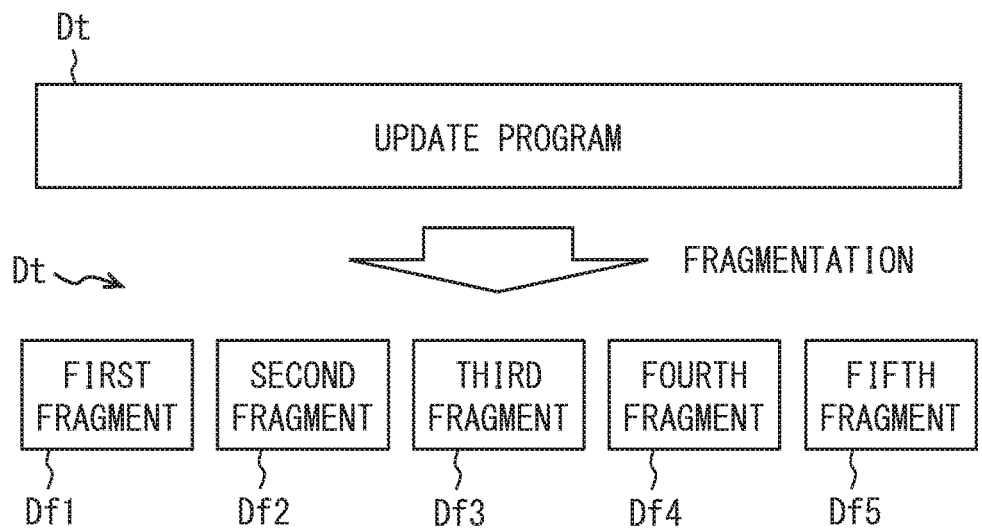
FIG. 15 is an explanatory view of a concept of fragmentation.

An update program of software transmitted and received as acquisition target data (requested data from a different viewpoint) may be divided into a plurality of fragments to be handled as depicted in FIG. 15. FIG. 15 exemplifies an aspect in which an update program Dt of software is divided into five fragments, namely, first to fifth fragments Df1 to Df5.

Figure 16:
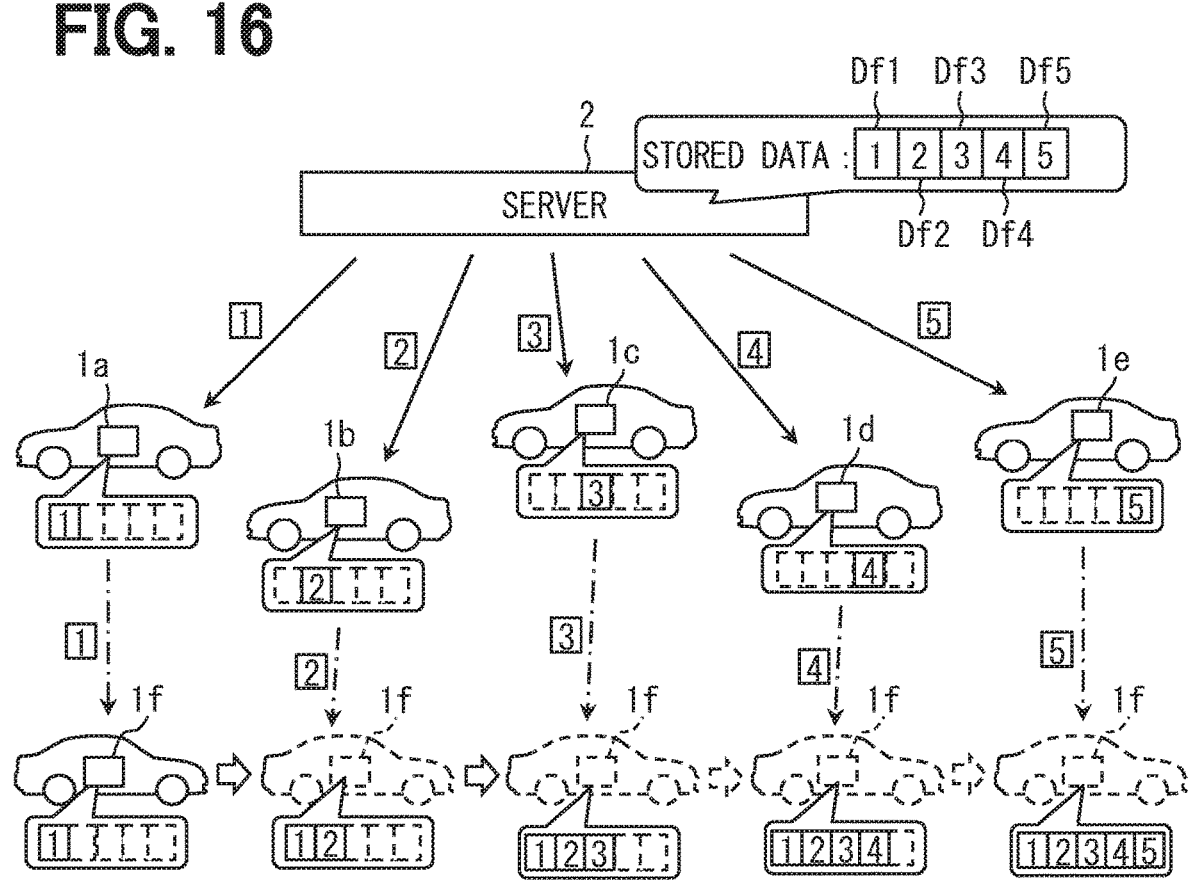
FIG. 16 is an explanatory view of operation executed by a moving body communication system 100 that is transmitting or receiving data per fragment.

Such a configuration enables transmission and reception of data per fragment as depicted in FIG. 16. FIG. 16 exemplifies an aspect in which different fragments are distributed one by one via wide-area communication to the five in-vehicle apparatus 1a to 1e.

Each of the in-vehicle apparatus 1 sets a fragment not provided to the subject apparatus as acquisition target data. The data acquisition processing thus allows each of the in-vehicle apparatus 1 to acquire the fragment not provided to the subject apparatus from the different apparatuses via narrow-area communication. For example, the in-vehicle apparatus 1a can acquire an update program as original data through acquisition of the second to fifth fragments Df2 to Df5 via narrow-area communication from the in-vehicle apparatus 1b to 1e, respectively.

In a state where the in-vehicle apparatus 1a to 1e are each positioned to be narrow-area communicable, if the in-vehicle apparatus 1b broadcast-transmits the second fragment Df2, the in-vehicle apparatus 1a as well as the in-vehicle apparatus 1c to 1e can acquire the second fragment Df2. The in-vehicle apparatus 1 share each of the fragments via narrow-area communication to reconstruct the update program as the original data to be applicable.

Such transmission and reception of data distributed into fragments achieves further reduction of communication fees of the respective in-vehicle apparatus 1. The data to be transmitted and received is smaller in size to shorten time necessary for transmission and reception of single piece of data. This configuration leads to higher possibility of success in transmission and reception of data even during relatively short time while oncoming vehicles are passing each other. From a different viewpoint, this configuration inhibits interruption of narrow-area communication (leading to failure in transmission or reception of data) during transmission or reception of the data due to movement of the in-vehicle apparatus 1.

Repeated acquisition of fragments while oncoming vehicles are passing each other will eventually achieve collection of all the fragments to obtain the applicable update program. Fragmentation of the update program facilitates acquisition of the update program by the in-vehicle apparatus 1. This configuration will also promote application of the update program. FIG. 16 depicts an in-vehicle apparatus 1f as an in-vehicle apparatus 1 mounted on a vehicle travelling on a lane opposite to a lane of the vehicles equipped with the in-vehicle apparatus 1a to 1e. The in-vehicle apparatus 1 can eventually obtain all the fragments through sequential acquisition of fragments from the respective in-vehicle apparatus 1 via narrow-area communication. FIG. 16 includes solid arrows each indicating a data shift direction via wide-area communication, and dashed arrows indicating a data shift direction via narrow-area communication.

Each of the fragments is eventually combined with the remaining fragments to be used in each of the in-vehicle apparatus 1. Each of the fragments thus also corresponds to the commonly used data according to the present disclosure. Each of the fragments can be handled similarly to the acquisition target data according to the above embodiment. Any fragment not acquired until an acquisition deadline is thus transmitted from the server 2 so that all the fragments are eventually obtained. Data transmitted from the server 2 can be part of the fragments constituting the original data even in such a case. This configuration achieves reduction of communication fees (in other words, communications traffic via wide-area communication) in comparison to a case where the original data is entirely acquired from the server 2 via wide-area communication.

Figure 17:
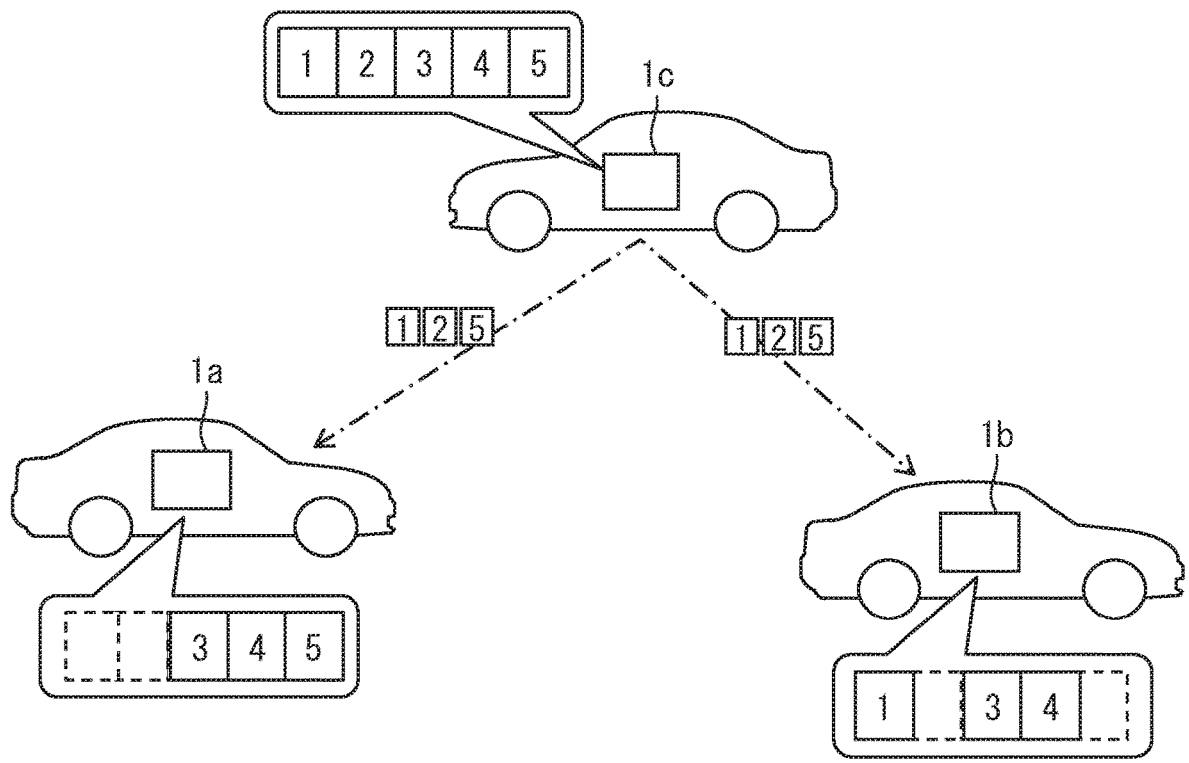
FIG. 17 is an explanatory view of operation executed by in-vehicle apparatus 1 that are each transmitting or receiving data per fragment.

As depicted in FIG. 17, when the in-vehicle apparatus 1a, 1b, and 1c are positioned to be narrow-area communicable with one another and the in-vehicle apparatus 1a requests the first and second fragments Df1 and Df2 whereas the in-vehicle apparatus 1b requests the second and fifth fragments Df2 and Df5, the in-vehicle apparatus 1c broadcast-transmits the fragments obtained by the logical sum (so-called OR) of the fragments requested by the in-vehicle apparatus 1a and 1b. Specifically, the in-vehicle apparatus 1c sequentially broadcast-transmits the first, second, and fifth fragments Df1, Df2, and Df5. Transmission of only the requested fragments allows the requester apparatuses to acquire the requested data, and also achieves reduction of communication traffic via narrow-area communication (inhibits crowded narrow-area communication).

The apparatus information management section G1 according to the sixth modification manages acquisition statuses of the plurality of fragments as the data acquisition status of each of the in-vehicle apparatus 1. The data acquisition statuses are thus individually managed per fragment. The server 2 receives distribution requests from the in-vehicle apparatus 1 also per fragment. The in-vehicle apparatus 1 may execute second and subsequent data distribution requests by setting only unacquired segments to acquisition target data. When distribution control is executed per fragment, the in-vehicle apparatus that has already acquired the fragment requested by the in-vehicle apparatus 1 (that is, an unacquired fragment) corresponds to the already-acquiring apparatus (specifically, fragment already-acquiring apparatus).

Seventh Modification

Figure 18:
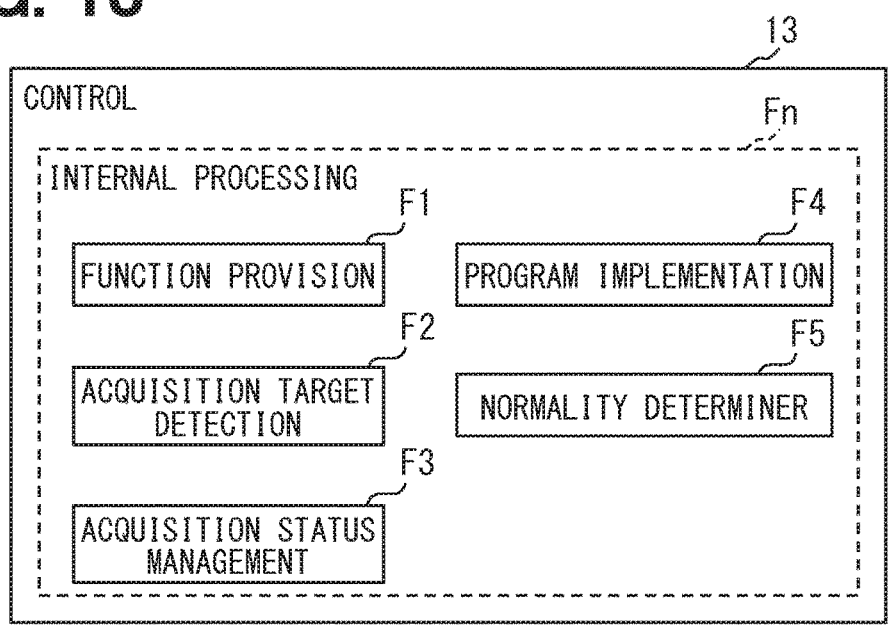
FIG. 18 is a block diagram depicting a controller 13 including a normality determination section F5.

The controller 13 may include a normality determination section F5 as depicted in FIG. 18. The normality determination section F5 is configured to determine legitimateness of an update program acquired by the narrow-area line acquisition section N1. FIG. 18 does not depict the wide-area communication processor Wn or the narrow-area communication processor Nn.

When the narrow-area line acquisition section N1 receives an update program (including a fragment) of software of an identical type a plurality of times, the normality determination section F5 compares the plurality of pieces of received data to determine legitimateness of the update program thus received. In an exemplary case where update programs of software of an identical type are received from three different in-vehicle apparatus 1, the normality determination section F5 compares to determine whether the update programs are identical. That is, the normality determination section F5 determines consistency (in other words, identity) of the plurality of pieces of data.

In a case where the pieces of received data are found to have identical contents, the update programs are determined as being legitimate. In another case where the pieces of received data include data having contents different from the contents of the remaining pieces of data, the normality determination section F5 determines that an invalid update program may have been received. Even in the case where the pieces of received data include data having contents different from the contents of the remaining pieces of data, legitimate data may be determined in accordance with the majority rule.

The program implementation section F4 applies the update program acquired via narrow-area communication after legitimateness is confirmed, and suspends application of any update program that may have invalid data. The program implementation section F4 does not apply any update program acquired by the narrow-area line acquisition section N1 until the normality determination section F5 determines that the update program has legitimate data. Such a configuration achieves higher information security.

The in-vehicle apparatus 1 may take a measure such as reporting, to the server 2, information (for example, the apparatus ID) on the in-vehicle apparatus 1 having distributed any update program possibly having invalid data. In such an aspect, the server 2 can specify any in-vehicle apparatus 1 having suspicious behavior on the basis of the report from the in-vehicle apparatus 1. The server 2 can further take a measure of preliminarily notifying the remaining in-vehicle apparatus 1 not to use data distributed from any suspicious in-vehicle apparatus 1 having been detected.

Eighth Modification

The normality determination section F5 according to the seventh modification is configured to determine legitimateness of received data through comparison between a plurality of pieces of received data. The normality determination section F5 is, however, not limited to this configuration. The normality determination section F5 may be configured to inquire of the server 2 as to hash information on received data, and the server 2 may determine whether the data received by the in-vehicle apparatus 1 is legitimate (in other words, validity). The hash information herein has a value (so-called hash value) obtained by inputting original data to a predetermined hash function.

In this case, the server 2 is configured to return a reply as to whether the data in question is legitimate data. The normality determination section F5 according to such an aspect is also configured to determine whether the update program acquired by the narrow-area line acquisition section N1 is legitimate.

The normality determination section F5 may preliminarily acquire hash information on acquisition target data from the server 2, and compare the hash information acquired from the server 2 with hash information generated from received data upon acquisition of the data via narrow-area communication to determine validity. Such a configuration will also exhibit effect similar to that according to the seventh modification. This configuration also exhibits effect that data validity can be determined without receiving data of an identical type a plurality of times.

Ninth Modification

Each of the in-vehicle apparatus 1 may be configured to voluntarily broadcast via narrow-area communication received data a predetermined number of times in a predetermined cycle upon acquisition of acquisition target data from the server 2 via wide-area communication.

The in-vehicle apparatus 1 may request the server 2 for a condition other than the acquisition deadline as a request relevant to data acquisition. For example, data distribution via wide-area communication may be prohibited. The in-vehicle apparatus 1 may each notify of priority between distribution via wide-area communication and distribution via narrow-area communication. The server 2 may operate in response to a request from the in-vehicle apparatus 1.

Tenth Modification

The server 2 according to the above embodiment is configured to transmit narrow-area acquirability notification to the requester apparatus on the basis of determination by the distribution apparatus searching section G3 that there is any already-acquiring apparatus around the requester apparatus. The server 2 is, however, not limited to this configuration. When the distribution apparatus searching section G3 determines that there is any already-acquiring apparatus around the requester apparatus, the server 2 may command the peripheral already-acquiring apparatus to transmit requested data via narrow-area communication, without any command to the requester apparatus.

In such a configuration, the notification section G4 may transmit, to the peripheral already-acquiring apparatus, a communication packet (that is, a narrow-area distribution command) as a command to transmit requested data via narrow-area communication. The in-vehicle apparatus 1 having received the narrow-area distribution command transmits the data via narrow-area communication as commanded by the server 2.

Eleventh Modification

The moving body communication system 100 may include a narrow-area communication unadapted apparatus having no narrow-area communication function, as an apparatus configured to request the server 2 to distribute data. In such a case where there are both the in-vehicle apparatus 1 and the narrow-area communication unadapted apparatus, each distribution requesting packet transmitted to the server 2 is assumed to have a data region indicating whether the requester apparatus has the narrow-area communication function. Data indicating whether the requester apparatus has the narrow-area communication function is binary data that can be expressed with one bit.

The server 2 changes details of the distribution request response processing depending on whether the requester apparatus has the narrow-area communication function. In a case where the requester apparatus has the narrow-area communication function, the server 2 executes distribution request response processing similar to that according to the above embodiment and the like. In another case where the requester apparatus does not have the narrow-area communication function, the server 2 distributes data via wide-area communication. The individual status data managed by the apparatus information management section G1 is assumed to include data indicating whether the in-vehicle apparatus 1 each have the narrow-area communication function.

Twelfth Modification

The server 2 according to the embodiment described above is configured to distribute an update program of software, although the server 2 is not limited to this configuration. The server 2 may be configured to distribute prompt information (hereinafter, referred to as a driving assist information) assisting driving operation by a driver. The data distributed by the server 2 may be driving assist data.

Examples of the driving assist data include video data of an accident spot and video data of an invisible region for the subject vehicle at an intersection or the like. The examples of the driving assist data may further include data indicating a road status relevant to traffic regulation, a traffic jam, an object on a road, and the like. These data may be used by the plurality of in-vehicle apparatus 1.

The server 2 may be configured to distribute a plurality of types of data. In this case, each of the in-vehicle apparatus 1 appropriately requests the plurality of types of data that the server 2 is ready to distribute. Acquisition target data has an acquisition deadline that may be determined in accordance with the type of data as a target of a distribution request to the server 2. For example, an update program of software has an acquisition deadline set to have relatively long duration in comparison to the driving assist data requiring promptness. An update program of software for fixes of bugs (particularly bugs related to security weakness) needs to be acquired and applied promptly, and may thus be preferably set to have relatively short duration. An update program for functional expansion has an acquisition deadline that may be set to have relatively long duration.

Information having promptness relevant to point information such as video data of an accident spot is regarded as information useful only in a specific region and a specific time zone. In the case where the in-vehicle apparatus 1 are each configured to voluntarily broadcast-transmit data acquired from the server 2 as exemplified in the eighth modification, the server 2 may be preferably configured to set a condition for broadcast-transmission of received data by the in-vehicle apparatus 1 such that the data is broadcast-transmitted in a limited region and a limited time zone. For example, the driving assist data distributed by the server 2 may include a term of validity and a valid region. The in-vehicle apparatus 1 having received data including the term of validity and the valid region broadcast-transmits the received data only during the term of validity in a case where the in-vehicle apparatus 1 is positioned within the valid region. Such a configuration inhibits broadcast-transmission in areas not needing the data.

Thirteenth Modification

The user apparatus disclosed in the present disclosure may be configured as a portable communication terminal like a smartphone or a tablet terminal. The user apparatus may be mounted on a machine tool, a heavy machine, a vending machine for canned drinks, or the like.

The commonly used data may be referred to as a common data.

It is noted that a flowchart or the processing of the flowchart in the present application includes multiple steps (also referred to as sections), each of which is represented, for instance, as S101. Further, each step can be divided into several sub-steps while several steps can be combined into a single step.

In the above, the embodiment, the configuration, an aspect of a moving body communication system according to the present disclosure are exemplified. However, the present disclosure is not limited to every embodiment, every configuration and every aspect related to the present disclosure are exemplified. For example, the field of the embodiment, the configuration, the aspect relate to the present disclosure includes the embodiment, the configuration, the aspect obtained by accordingly combining each technical part disclosed in different embodiment, configuration and aspect.

What is claimed is:

1. A moving body communication system comprising:
a plurality of user apparatuses each used on a moving body; and
a server that is configured to distribute, to at least one of the user apparatuses as a requester, commonly used data as data used commonly by the plurality of the user apparatuses, based on a request from the at least one of the user apparatuses,
wherein:
the server and each of the plurality of user apparatuses are configured to be mutually communicable via a wide-area communication network;
each of the plurality of the user apparatuses includes
a reporting section that is configured to sequentially transmit, to the server, a position reporting packet as a communication packet indicating positional information on a current position, and
a narrow-area communicator as a communication module configured to execute narrow-area communication as direct wireless communication not using the wide-area communication network with each different apparatus as a different one of the user apparatuses;
the server includes
a management database that is implemented by a predetermined rewritable storage medium, and is configured to store data indicating an acquisition status of the commonly used data and positional information on each of the user apparatuses,
an apparatus information management section that is configured to update the positional information on each of the user apparatuses stored in the management database, based on the position reporting packet transmitted from each of the plurality of the user apparatuses, a peripheral apparatus search section that is configured to refer to the management database in response to receipt of a distribution request for the commonly used data from any one of the user apparatuses, and determine whether at least one already-acquiring apparatus as the user apparatus that has already acquired the commonly used data exists around the requester, a notification section that is configured to notify the requester of acquirability of the commonly used data via the narrow-area communication in response to a determination by the peripheral apparatus search section that the already-acquiring apparatus exists around the requester, and a distribution section that is configured to distribute the commonly used data in response to a determination by the peripheral apparatus search section that no already-acquiring apparatus exists around the requester; and the user apparatus as the requester includes a narrow-area line acquisition section that is configured to execute processing for acquisition of the commonly used data from the already-acquiring apparatus positioned around the requester via the narrow-area communication in response to that the acquirability of the commonly used data via the narrow-area communication is notified as a response from the server to the distribution request.

2. The moving body communication system according to claim 1, wherein:

the reporting section transmits, to the server, an acquisition success notification as a communication packet indicating successful acquisition of the commonly used data in response to that the narrow-area line acquisition section acquires the commonly used data;

the apparatus information management section is configured to update the acquisition status of the commonly used data for each of the user apparatuses registered in the management database, in response to the acquisition success notification transmitted from the user apparatus and an operation result of the distribution section;

the peripheral apparatus search section selects a representative distributor apparatus as the already-acquiring apparatus which transmits the commonly used data via the narrow-area communication to the user apparatus as the requester from among the already-acquiring apparatuses, based on the current position and the acquisition status of the commonly used data for each of the user apparatuses registered in the management database; and the notification section transmits, to the representative distributor apparatus selected by the peripheral apparatus search section and the requester, a communication packet causing the requester to acquire the commonly used data from the representative distributor apparatus via the narrow-area communication.

3. The moving body communication system according to claim 2, wherein:

the notification section transmits, to the representative distributor apparatus selected by the peripheral apparatus search section, a narrow-area distribution command as a communication packet as a command to transmit the commonly used data to the requester via the narrow-area communication; and the notification section further transmits, to the requester, a narrow-area reception standby command as a communication packet as a command to stand by for predetermined time until distribution of the commonly used data via the narrow-area communication.

4. The moving body communication system according to claim 2, wherein:

the position reporting packet transmitted by each of the plurality of the user apparatuses includes positional information indicating the current position and information indicating a moving direction and moving speed;

an estimated value as a communicable distance by the narrow-area communicator is set in advance;

the apparatus information management section is configured to store, in the management database, data indicating the positional information, the moving direction, and the moving speed of each of the user apparatuses, based on the position reporting packet transmitted from each of the plurality of the user apparatuses; and the peripheral apparatus search section determines whether any promptly distributable apparatus as the already-acquiring apparatus distant from the requester within the narrow-area communicable distance exists or not, based on the positional information on each of the user apparatuses registered in the management database, determines whether any shortly distributable apparatus as the already-acquiring apparatus becoming distant from the requester by at most the narrow-area communicable distance within predetermined time from current time exists or not, in accordance with the positional information, the moving direction, and the moving speed of each of the user apparatuses registered in the management database, in response to that no promptly distributable apparatus exists, and determines that the already-acquiring apparatus exists around the requester in response to that at least one of the promptly distributable apparatus or the shortly distributable apparatus exists.

5. The moving body communication system according to claim 2, wherein:

the position reporting packet transmitted by each of the plurality of the user apparatuses includes positional information indicating the current position and information indicating a moving direction and moving speed;

the apparatus information management section is configured to store, in the management database, data indicating the positional information, the moving direction, and the moving speed of each of the user apparatuses, based on the position reporting packet transmitted from each of the plurality of the user apparatuses; and the peripheral apparatus search section extracts the already-acquiring apparatuses in accordance with the acquisition status of the commonly used data for each of the user apparatuses registered in the management database, and determines, as the representative distributor apparatus, the already-acquiring apparatus enabling to execute the narrow-area communication with the requester for longest duration based on the current position, the moving direction, and the moving speed of each of the already-acquiring apparatuses registered in the management database.

6. The moving body communication system according to claim 5, wherein:

an estimated value as a communicable distance by the narrow-area communicator is set in advance; and the peripheral apparatus search section
   determines whether any promptly distributable apparatus as the already-acquiring apparatus distant from the requester within the narrow-area communicable distance exists or not, based on the positional information on each of the user apparatuses registered in the management database,
   determines whether any shortly distributable apparatus as the already-acquiring apparatus becoming distant from the requester by at most the narrow-area communicable distance within predetermined time from current time exists or not, based on the positional information, the moving direction, and the moving speed of each of the user apparatuses registered in the management database, in response to that no promptly distributable apparatus exists, and
   determines that the already-acquiring apparatus exists around the requester when at least one of the promptly distributable apparatus or the shortly distributable apparatus exists.

7. The moving body communication system according to claim 2, wherein:
the peripheral apparatus search section
   extracts the already-acquiring apparatuses based on the acquisition status of the commonly used data for each of the user apparatuses registered in the management database, and
   determines, as the representative distributor apparatus, the already-acquiring apparatus closest to the requester, based on the current position of each of the already-acquiring apparatuses registered in the management database.

8. The moving body communication system according to claim 2, wherein:
the position reporting packet transmitted by each of the plurality of the user apparatuses includes positional information indicating the current position and information indicating a moving direction and moving speed;
the apparatus information management section is configured to store, in the management database, data indicating the positional information, moving direction, and moving speed of each of the user apparatuses, based on the position reporting packet transmitted from each of the plurality of the user apparatuses;
the server is configured to sequentially receive the distribution request for the commonly used data from the user apparatuses and collectively reply to the distribution requests sequentially received in a predetermined cycle; and
in response to receiving the plurality of distribution requests in one cycle, the peripheral apparatus search section sets, as the representative distributor apparatus, the already-acquiring apparatus positioned to most efficiently distribute the commonly used data to each of the plurality of the requesters among the already-acquiring apparatuses, in accordance with the current position, the moving direction, the moving speed, and the acquisition status of the commonly used data for each of the user apparatuses registered in the management database.

9. The moving body communication system according to claim 2, wherein:
in response to that the peripheral apparatus search section determines that no already-acquiring apparatus exists around the requester,
   the distribution section distributes the commonly used data to the user apparatus having highest efficiency of wide-area communication among the user apparatuses distant within most predetermined distance from the current position of the requester, and provides the commonly used data to the requester directly or indirectly via the narrow-area communication.

10. The moving body communication system according to claim 1, wherein:
the server divides a single piece of the commonly used data into a plurality of fragments to be distributed;
when there is any unacquired fragment as an unacquired one of the fragments constituting the commonly used data, the user apparatus requests the server to distribute the unacquired segment;
the apparatus information management section is configured to manage an acquisition status of each of the fragments as the acquisition status of the commonly used data for each of the user apparatuses;
the peripheral apparatus search section refers to the management database in response to receipt of a distribution request for the unacquired fragment from any one of the user apparatuses, and determines whether there is, around the requester, any fragment already-acquiring apparatus as the user apparatus storing the unacquired fragment;
in response to that the peripheral apparatus search section determines that the fragment already-acquiring apparatus exists around the requester, the notification section notifies the requester of acquirability of the unacquired fragment via the narrow-area communication;
the distribution section distributes the unacquired fragment in response to a determination by the peripheral apparatus search section that no fragment already-acquiring apparatus exists around the requester; and
the narrow-area line acquisition section executes processing for acquisition of the unacquired fragment from the fragment already-acquiring apparatus positioned around the requester via the narrow-area communication in response to that acquirability of the unacquired fragment via the narrow-area communication is notified as a response from the server to the distribution request.

11. The moving body communication system according to claim 1, wherein:
the commonly used data is an update program of software used on a vehicle; and
each of the user apparatuses is mounted on a vehicle.

12. The moving body communication system according to claim 11, further comprising:
a program implementation section configured to use the update program; and
a normality determination section configured to determine legitimateness of the update program acquired by the narrow-area line acquisition section,
wherein:
the program implementation section does not use the update program acquired by the narrow-area line acquisition section until the normality determination section determines that the update program has legitimate data.

13. A communication system comprising:
a plurality of user apparatuses each mounted on a moving body; and
a server that is configured to distribute common data based on a request from the at least one of the user apparatuses as a requester, the common data being used commonly by the plurality of the user apparatuses,
wherein:
the server and each of the plurality of user apparatuses are configured to be mutually communicable via a communication network;
each of the plurality of the user apparatuses transmit, to the server, a position reporting packet indicative of positional information on a current position of the corresponding user apparatus;
each of the plurality of the user apparatuses includes a communication module that executes communication as direct wireless communication not using the communication network, with each different apparatus as a different one of the user apparatuses;
the server includes a management database that stores data indicating an acquisition status of the common data and positional information on each of the user apparatuses;
the server is configured to
 update the positional information on each of the user apparatuses stored in the management database, based on the position reporting packet transmitted,
 refer to the management database in response to receipt of a distribution request for the common data from the requester so as to determine whether at least one of the user apparatus that has already acquired the common data as an already-acquiring apparatus exists around the requester,
 notify the requester of acquirability of the common data via the communication in response to a determination that the already-acquiring apparatus exists around the requester, and
 distribute the common data in response to a determination that no already-acquiring apparatus exists around the requester; and
the user apparatus as the requester is configured to execute processing for acquisition of the common data from the already-acquiring apparatus positioned around the requester via the communication, in response to that the server notifies the user apparatus as the requester that the common data is available to be acquired via the communication.

* * * * *